(12) United States Patent
Sato et al.

(10) Patent No.: US 12,105,459 B2
(45) Date of Patent: Oct. 1, 2024

(54) IMAGE FORMING APPARATUS

(71) Applicant: CANON KABUSHIKI KAISHA, Tokyo (JP)

(72) Inventors: Kengo Sato, Saitama (JP); Kenji Aoki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/355,664

(22) Filed: Jul. 20, 2023

(65) Prior Publication Data
US 2024/0036504 A1 Feb. 1, 2024

(30) Foreign Application Priority Data

Jul. 28, 2022 (JP) ................. 2022-120556

(51) Int. Cl.
*G03G 15/20* (2006.01)
*G03G 15/00* (2006.01)
*G06K 15/16* (2006.01)
*G06K 15/12* (2006.01)

(52) U.S. Cl.
CPC ......... *G03G 15/6529* (2013.01); *G06K 15/16* (2013.01); *G03G 15/6561* (2013.01); *G03G 15/6588* (2013.01); *G06K 15/129* (2013.01)

(58) Field of Classification Search
CPC ........... G03G 15/6529; G03G 15/6558; G03G 15/6561; G03G 15/6564; G03G 15/6567; G03G 15/6588; G06K 15/129; G06K 15/16

USPC .................................. 399/388, 389
See application file for complete search history.

(56) References Cited

U.S. PATENT DOCUMENTS

| 7,900,918 B2 | 3/2011 | Ono et al. |
| 10,747,161 B2 * | 8/2020 | Nakamura ......... G03G 15/0865 |
| 10,852,683 B2 * | 12/2020 | Matsumoto .......... G03G 15/602 |
| 2021/0403262 A1 * | 12/2021 | Iwata ....................... B65H 7/04 |

FOREIGN PATENT DOCUMENTS

| JP | 2008081251 A | 4/2008 |
| JP | 2016008110 A | 1/2016 |

* cited by examiner

*Primary Examiner* — Hoang X Ngo
(74) *Attorney, Agent, or Firm* — ROSSI, KIMMS & McDOWELL LLP

(57) ABSTRACT

An image forming apparatus includes a first roller pair including a first roller and a second roller, a first driving unit, a second roller pair, a second driving unit, an image forming unit, and a control unit configured to execute a first mode and a second mode. The second mode includes (1) a first processing, (2) a second processing, and (3) a third processing of controlling the first driving unit such that the rotational speed of the first roller pair becomes faster than the second rotational speed. The first mode includes (1) a fourth processing, (2) a fifth processing, and (3) a sixth processing of controlling the first driving unit such that the rotational speed of the first roller pair is decelerated from the first rotational speed to equal to or less than the second rotational speed.

12 Claims, 15 Drawing Sheets

IMAGE FORMING APPARATUS

BACKGROUND OF THE INVENTION

Field of the Invention

This disclosure relates to an image forming apparatus forming an image on a sheet.

Description of the Related Art

Generally, in sheet conveyance apparatuses (paper sheet conveyance apparatuses) included in image forming apparatuses, a plurality of roller pairs conveying a sheet while nipping the sheet are arranged in a row from upstream to downstream in a sheet conveyance direction. In such sheet conveyance apparatuses, so as to prevent the occurrence of soiling caused by ink adhered to rollers and the occurrence of scratches, an apparatus in which rollers constituting a first roller pair located upstream of a second roller pair are disengaged from each other at a time of conveying the sheet by the second roller pair is proposed (refer to Japanese Patent Laid-Open No. 2016-8110).

Recently, printing that allows various types of the sheets is demanded, and, for example, there is a case of conveying, for example, extremely thick paper, such as paper board and cardboard, whose sheet thickness is considerably thick. In such a case, even by disengaging the rollers of the first roller pair described in Patent Literature 1 above, the first roller pair sometimes comes into contact with, in particular, a trailing edge of the sheet. Then, there is a possibility that the quality degradation of deliverables is caused by the generation of a so-called edge curl in which an edge of the sheet is rolled up at the trailing edge.

SUMMARY OF THE INVENTION

According to one aspect of the present invention, an image forming apparatus includes a first roller pair including a first roller and a second roller, the first roller pair being configured to transit between a contact state in which the first roller and the second roller are configured to convey a sheet by coming into contact with each other, and a separated state in which the first roller and the second roller are separated from each other, a first driving unit configured to drive the first roller pair, a second roller pair disposed downstream of the first roller pair in a conveyance direction of the sheet, a second driving unit configured to drive the second roller pair, an image forming unit disposed downstream of the second roller pair in the conveyance direction and configured to form an image on the sheet, and a control unit configured to execute a first mode in a case where a thickness of the sheet is a first thickness, and configured to execute a second mode in a case where the thickness of the sheet is a second thickness thinner than the first thickness. The second mode includes (1) a first processing of controlling the first driving unit and the second driving unit such that rotational speeds of the first roller pair and the second roller pair become a first rotational speed, and of conveying the sheet to the second roller pair by the first roller pair which is in the contact state, (2) a second processing of transiting the first roller pair from the contact state to the separated state, and (3) a third processing of controlling the second driving unit such that the rotational speed of the second roller pair is decelerated from the first rotational speed to a second rotational speed less than the first rotational speed, and of controlling the first driving unit such that the rotational speed of the first roller pair becomes faster than the second rotational speed. The first mode includes (1) a fourth processing of controlling the first driving unit and the second driving unit such that the rotational speeds of the first roller pair and the second roller pair become the first rotational speed, and of conveying the sheet to the second roller pair by the first roller pair which is in the contact state, (2) a fifth processing of transiting the first roller pair from the contact state to the separated state, and (3) a sixth processing of controlling the second driving unit such that the rotational speed of the second roller pair is decelerated from the first rotational speed to the second rotational speed, and of controlling the first driving unit such that the rotational speed of the first roller pair is decelerated from the first rotational speed to equal to or less than the second rotational speed.

Further features of the present invention will become apparent from the following description of exemplary embodiments with reference to the attached drawings.

BRIEF DESCRIPTION OF TIE DRAWINGS

DESCRIPTION OF THE EMBODIMENTS

Figure 1:
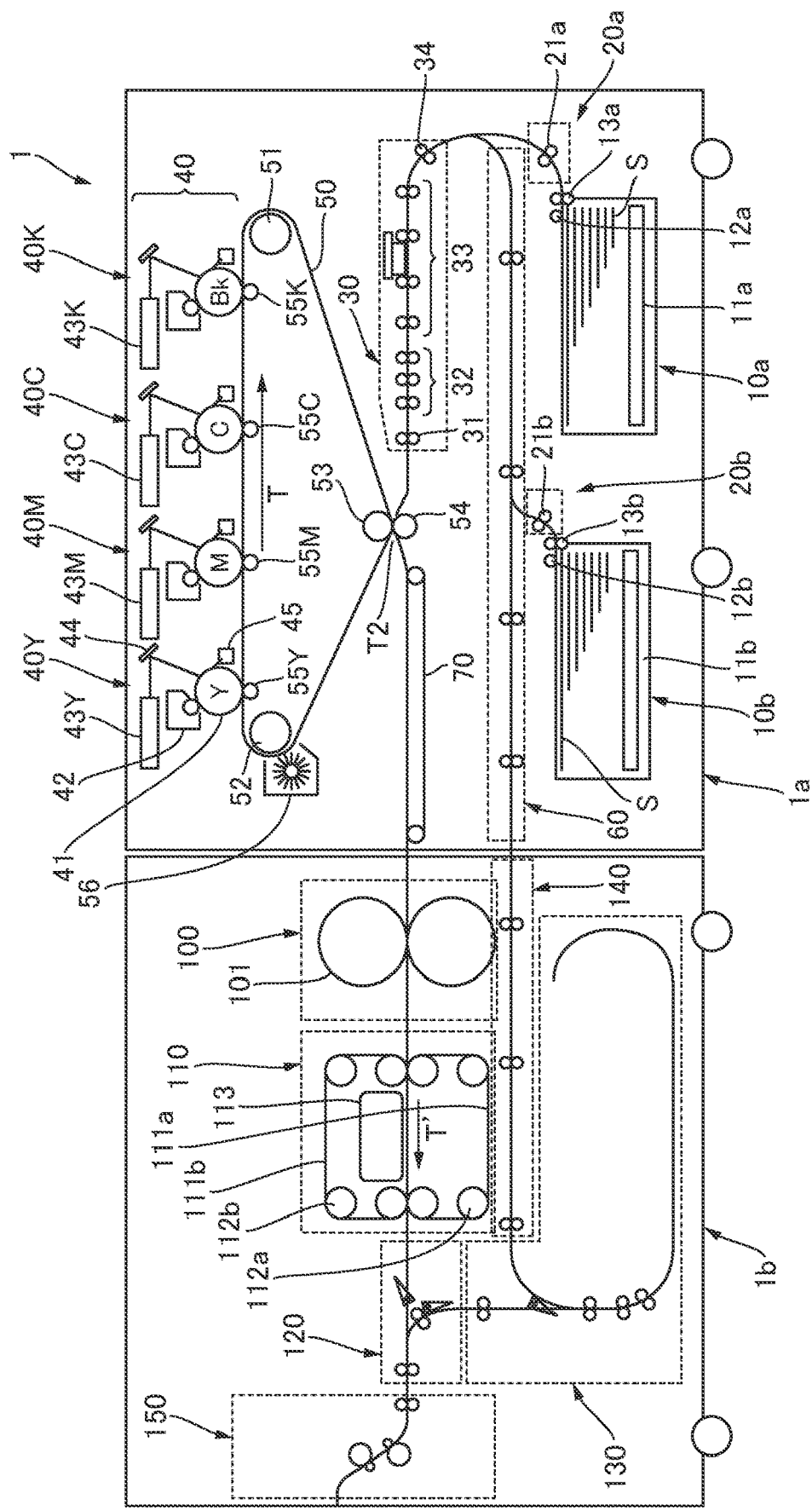
FIG. 1 is a cross-sectional view illustrating an image forming apparatus of the present embodiment.

Hereinafter, the present embodiment will be described using diagrams. First, a schematic configuration of an image forming apparatus of the present embodiment will be described using FIG. 1. FIG. 1 is a cross-sectional view illustrating the image forming apparatus of the present embodiment.

Schematic Configuration of Image Forming Apparatus

A printer 1, serving as the image forming apparatus, is a full color laser beam printer of an electrophotographic system. As illustrated in FIG. 1, the printer 1 includes a casing 1a incorporating units performing a feed of a sheet and image formation, and a casing 1b incorporating units performing fixing of a toner image and cooling of the sheet.

The casing 1a includes sheet feed units 10a and 10b, extraction units 20a and 20b, a registration unit 30, serving as a sheet conveyance apparatus, an image forming unit 40, serving as an image forming unit, and a first duplex conveyance unit 60. The casing 1b includes a fixing unit 100, a cooling unit 110, a branch conveyance unit 120, a second duplex conveyance unit 140, a reverse conveyance unit 130, a second duplex conveyance unit 140, and a sheet discharge decurler unit 150.

The image forming unit 40 includes four process cartridges 40Y, 40M, 40C, and 40K, respectively forming the toner images of four colors, i.e., yellow (Y), magenta (M), cyan (C), and black (K), and exposing units 43Y, 43M, 43C, and 43K. To be noted, the four process cartridges 40Y, 40M, 40C, and 40K are the same in a configuration except for differences in colors of the formed images. Therefore, only a configuration and an image forming process of the process cartridge 40Y will be described, and descriptions of the process cartridges 40M, 40C, and 40K will be omitted herein.

The process cartridge 40Y includes a photosensitive drum 41, a charge roller, not shown, a developing unit 42, and a cleaner 45. The photosensitive drum 41 is formed by coating an organic photoconductive layer on an outer circumference of an aluminum cylinder, and is rotatably driven by a drive motor, not shown. Further, an intermediate transfer belt 50, serving as an image bearing member rotatably driven in an arrow T direction in FIG. 1 by a drive roller 52, is disposed to the image forming unit 40, and the intermediate transfer belt 50 is wound over a tension roller 51, the drive roller 52, and a secondary transfer inner roller 53. Primary transfer rollers 55Y, 55M, 55C, and 55K are disposed inside of the intermediate transfer belt 50, and a secondary transfer outer roller 54, facing the secondary transfer inner roller 53 and serving as a transfer roller, is disposed outside of the intermediate transfer belt 50.

The sheet feed unit 10a includes a lift plate 11a ascending and descending while stacking the sheet S, a pickup roller 12a feeding the sheet S stacked on the lift plate 11a, and a separation roller pair 13a separating the fed sheet S into one sheet at a time. Similarly, the sheet feed unit 10b includes a lift plate 11b ascending and descending while stacking the sheet S, a pickup roller 12b feeding the sheet S stacked on the lift plate 11b, and a separation roller pair 13b separating the fed sheet S into one sheet at a time.

While details will be described below, the registration unit 30 includes a shift roller pair 31 correcting the positional displacement of the sheet S, a plurality of obliquely conveying roller pairs 32 correcting the skew of the sheet S, and a plurality of conveyance roller pairs 33 and 34 conveying the sheet S to the obliquely conveying roller pairs 32.

On the other hand, the fixing unit 100 arranged in the casing 1b includes a fixing roller pair 101 capable of heating. Further, the cooling unit 110 includes an upper cooling belt 111b rotatably driven in an arrow T' direction by an upper cooling drive roller 112a. The cooling unit 110 includes a lower cooling belt 111a, rotatably driven in the arrow T' direction by a lower cooling drive roller 112b, and a heat sink 113 for cooling the sheet.

Image Forming Operation

Next, an image forming operation of the printer 1 configured as described above will be described. When an image signal is input from, for example, such as a computer 300 (refer to FIG. 2), which is an external personal computer, to the exposing unit 43Y, a laser beam corresponding to the image signal is emitted onto the photosensitive drum 41 of the process cartridge 40Y from the exposing unit 43Y.

At this time, a surface of the photosensitive drum 41 has been uniformly charged to a predetermined polarity and potential beforehand by the charge roller, not shown, and, by being irradiated with the laser beam from the exposing unit 43 via a mirror 44, an electrostatic latent image is formed on the surface. The electrostatic latent image formed on the photosensitive drum 41 is developed by the developing unit 42, and the toner image of yellow (Y) is formed on the photosensitive drum 41.

Similarly, the laser beam is emitted onto each of the photosensitive drums of the process cartridges 40M, 40C, and 40K from the exposing units 43M, 43C, and 43K, and the toner images of magenta (M), cyan (C), and black (K) are formed on the respective photosensitive drums. The toner image of each color formed on each of the photosensitive drums is transferred onto the intermediate transfer belt 50 by the primary transfer rollers 55Y, 55M, 55C, and 55K. Then, a full color toner image is conveyed to a secondary transfer nip T2, formed by the secondary transfer inner and outer rollers 53 and 54, by the intermediate transfer belt 50 rotatably driven by the drive roller 52. The toner remained on the photosensitive drum 41 is collected by the cleaner 45. To be noted, the image forming process of each color is performed in a timing superimposing the toner image on an upstream toner image that has been primarily transferred onto the intermediate transfer belt 50.

In parallel with this image forming process, the sheet S is fed from either one of the sheet feed units 10a and 10b, and the sheet S is conveyed to the registration unit 30 by either one of the extraction units 20a and 20b. The positional displacement and the skew of this sheet S are corrected by the registration unit 30, and, in synchronization with a timing in which the full color toner image formed on the intermediate transfer belt 50 reaches the secondary transfer nip T2, the sheet S is conveyed to the secondary transfer nip T2. Then, the full color toner image on the intermediate transfer belt 50 is transferred onto a first sheet surface (front surface) of the sheet S by applying a secondary transfer bias to the secondary transfer outer roller 54. To be noted, the toner remained on the intermediate transfer belt 50 is collected by a belt cleaner 56.

The sheet S onto which the toner image has been transferred is conveyed to the fixing unit 100 by a pre-fixing conveyance unit 70. Then, the sheet S is guided to a nip of the fixing roller pair 101, and predetermined heat and pressure are applied, so that the toner is melted and bonded (fixed). In the cooling unit 110, the sheet S having passed through the fixing unit 100 is conveyed while being nipped by the upper and lower cooling belts 111*b* and 111*a*, which are endless belts. Then, the sheet S is brought into contact with the heat sink 113 via the upper cooling belt 111*b*, and is cooled by transferring the heat to the heat sink 113.

Subsequently, the path selection of conveying to either the sheet discharge decurler unit 150 or the reverse conveyance unit 130 is performed by the branch conveyance unit 120. To be noted, the branch conveyance unit 120 can also convey the sheet S to the sheet discharge decurler unit 150 after having conveyed the sheet S to the reverse conveyance unit 130 and inverted the sheet S such that the first sheet surface, on which the image has been formed in the secondary transfer nip T2, becomes a lower side.

In a case where the image is formed only on one side of the sheet S, the sheet S is conveyed from the branch conveyance unit 120 to the sheet discharge decurler unit 150, and a curl of the sheet S is corrected by a small diameter hard roller and a large diameter soft roller. Subsequently, the sheet S having passed through the sheet discharge decurler unit 150 is either discharged outside of the apparatus or delivered to a sheet discharge optional apparatus, not shown.

In a case where the image formation is performed on both surfaces of the sheet S, the sheet S is conveyed to the reverse conveyance unit 130 by the branch conveyance unit 120, and is switchbacked in the reverse conveyance unit 130. The switchbacked sheet S is conveyed from the reverse conveyance unit 130 to the second duplex conveyance unit 140 and the first duplex conveyance unit 60, and is guided to the registration unit 30. Thereafter, the image is formed on a second surface (back surface) of the sheet S in the secondary transfer nip T2, and, then, via the branch conveyance unit 120 and the sheet discharge decurler unit 150, the sheet S is either discharged outside of the apparatus or delivered to the sheet discharge optional apparatus, not shown.

Configuration of Control System

Figure 2:
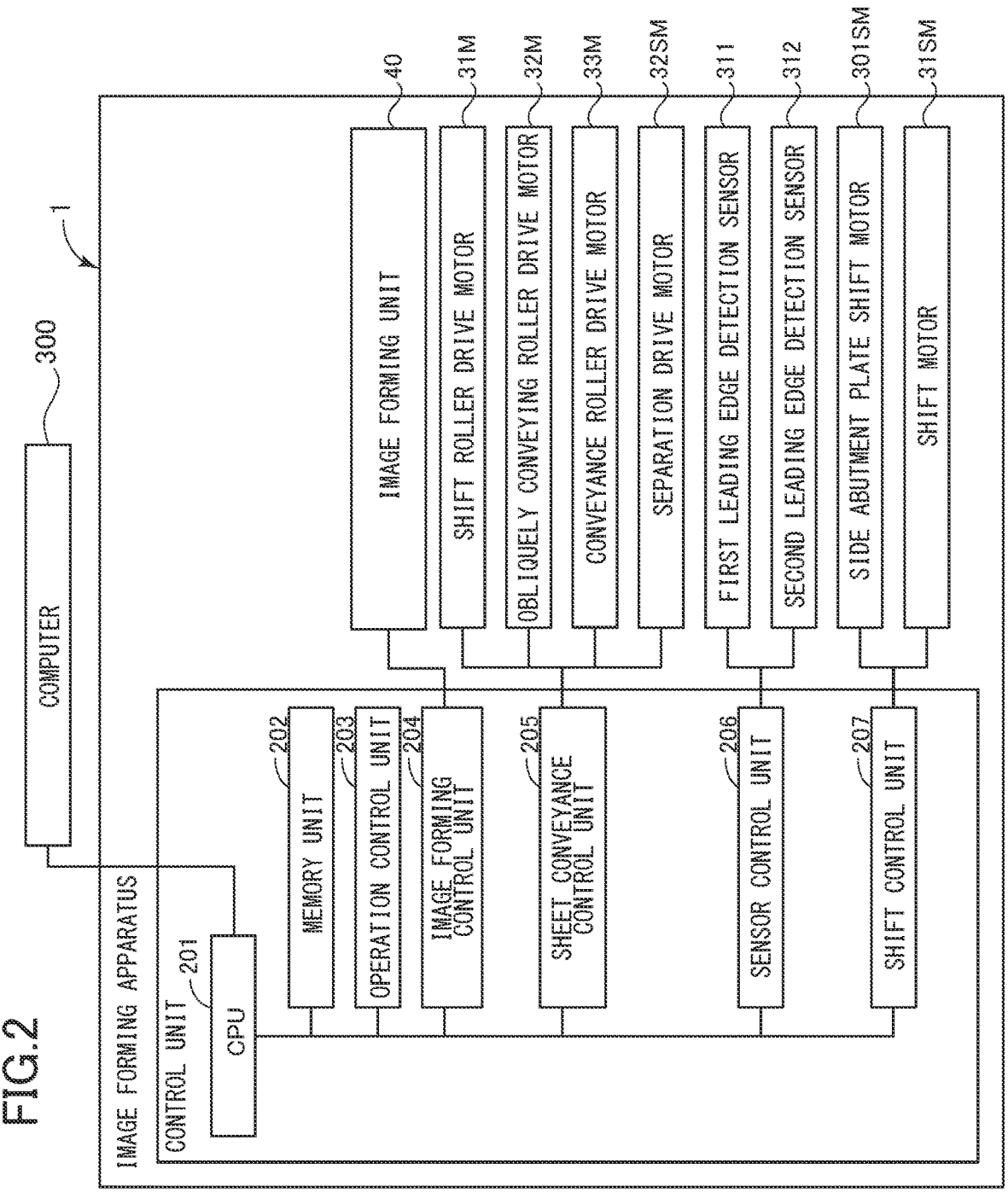
FIG. 2 is a block diagram illustrating a control system of the image forming apparatus of the present embodiment.

Next, a configuration of a control system in the printer 1 described above will be described using FIG. 2. FIG. 2 is a block diagram illustrating the control system of the image forming apparatus of the present embodiment.

The printer 1 described above includes a control unit 200. To that control unit 20, such as the computer 300 and various sensors are coupled in a manner capable of inputting a signal, and such as the image forming unit 40 described above and various motors are coupled controllably.

In particular, the control unit 200 includes hardware configurations of such as a central processing unit (CPU), and a random access memory (RAM) and a read only memory (ROM), not shown. In the control unit 200, these hardware configurations are configured such that a memory unit 202, an operation control unit 203, an image forming control unit 204, a sheet conveyance control unit 205, a sensor control unit 206, and a shift control unit 207 perform their respective functions using such as a program.

The memory unit 202 can temporarily store various signals and data. The operation control unit 203 is coupled to an operation unit, not shown, disposed in the printer 1, and performs control such as inputting a signal from the operation unit and displaying an image. The image forming control unit 204 is coupled to the image forming unit 40, and controls the image forming unit 40. The image forming control unit 204 sends the image signal included in such as a print job sent from, for example, the computer 300 to the image forming unit 40, and, while controlling each process cartridge, forms the toner image on the intermediate transfer belt 50 as described above.

The sheet conveyance control unit 205 is coupled to such as a shift roller drive motor 31M, serving as a second driving unit, an obliquely conveying roller drive motor 32M, serving as a first driving unit, a conveyance roller drive motor 33M, and a separation drive motor 32SM, and controls these motors. The shift roller drive motor 31M is a motor driving a drive roller in the shift roller pair 31 of the registration unit 30, described in detail below, and feely controls a rotational speed (that is, sheet conveyance speed) of the shift roller pair 31, including driving and stopping of the shift roller pair 31. Similarly, the obliquely conveying roller drive motor 32M is a motor driving each of drive rollers driving the plurality of obliquely conveying roller pairs 32, described in detail below, and feely controls rotational speeds (that is, sheet conveyance speed) of the obliquely conveying roller pairs 32, including driving and stopping of the obliquely conveying roller pairs 32. Similarly, the conveyance roller drive motor 33M is a motor driving each of drive rollers driving the plurality of conveyance roller pairs 33, described in detail below, and feely controls rotational speeds (that is, sheet conveyance speed) of the conveyance roller pairs 33, including driving and stopping of the conveyance roller pairs 33. That is, in the printer 1 of the present embodiment, the rotational speeds of the shift roller pair 31, the plurality of obliquely conveying roller pairs, and the plurality of conveyance roller pairs 33 are freely and independently controllable by the motors different from each other.

The separation drive motor 32SM performs the drive of switching between a nipping conveying state, in which drive rollers and driven rollers of the plurality of obliquely conveying roller pair 32 are pressed onto the sheet so as to nip and convey the sheet, and a non-nipping state, in which the drive rollers and the driven rollers are disengaged from each other so as to release a nip of the sheet. That is, by performing the drive control of these motors, while correcting the skew of the sheet, as described in detail below, the sheet conveyance control unit 205 conveys the sheet to the secondary transfer portion T2 in synchronization with a timing of the toner image borne on the intermediate transfer belt 50 described above. To be noted, the drive control of these motors will be described in detail below.

The sensor control unit 206 is coupled to sensors such as a first leading edge detection sensor 311 and a second leading edge detection sensor 312 (refer to FIG. 3), described in detail below, and signals from these sensors are input to the sensor control unit 206. The sensor control unit 206 detects a position of the sheet based on the signals which are input when the first and second leading edge detection sensors 311 and 312 have detected a leading edge of the sheet in the registration unit 30.

The shift control unit 207 is coupled to a side abutment plate shift motor 301SM and a shift motor 31SM, and performs the drive control of these motors. The side abutment plate shift motor 301SM performs the drive control of a side abutment plate 301, described in detail below, in a width direction orthogonal to the sheet conveyance direction. The shift motor 31SM performs the drive control of the shift roller pair 31 described above in the width direction.

Details of Registration Unit

Figure 3:
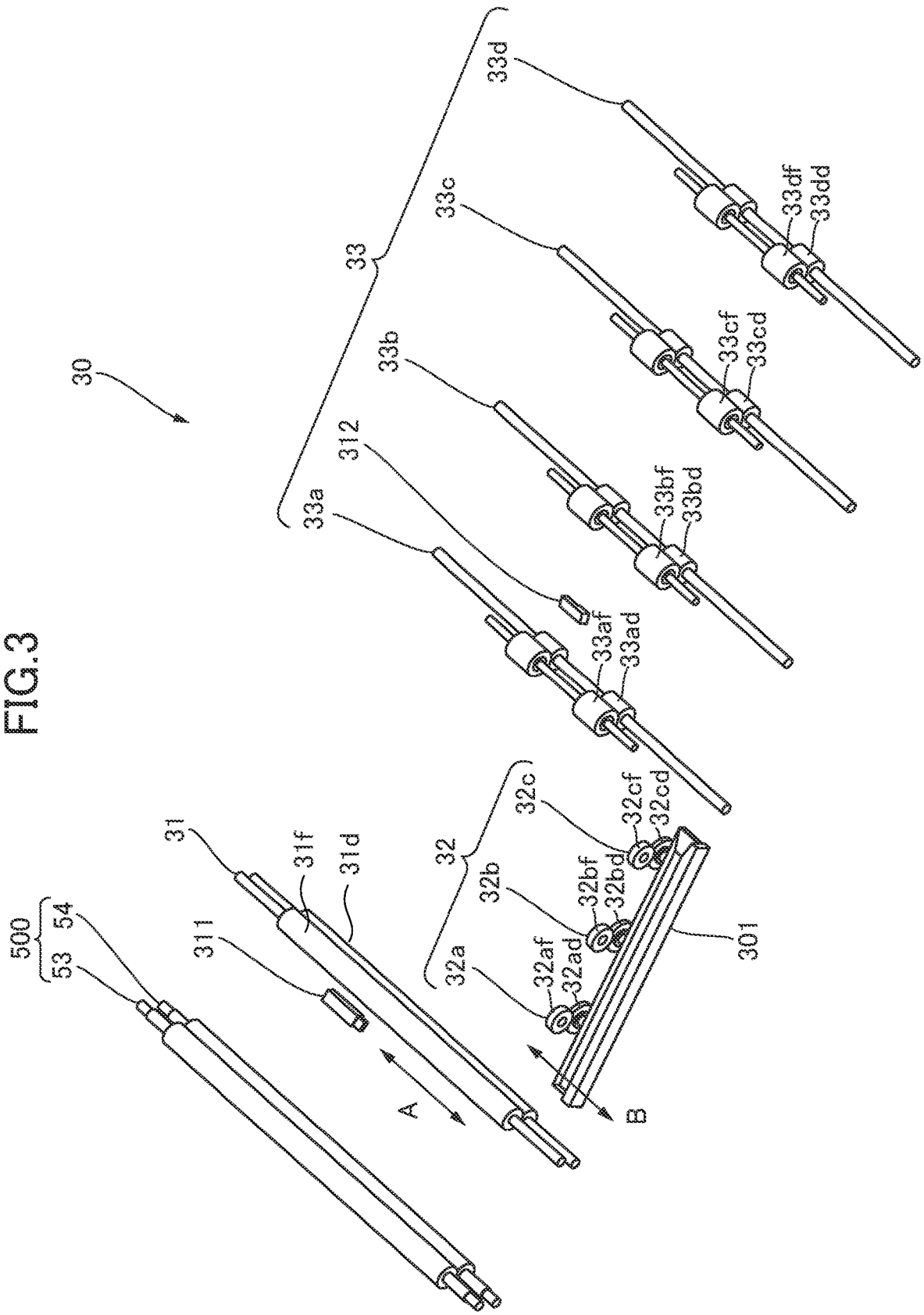
FIG. 3 is a perspective view illustrating a registration unit of the present embodiment.
Figure 4:
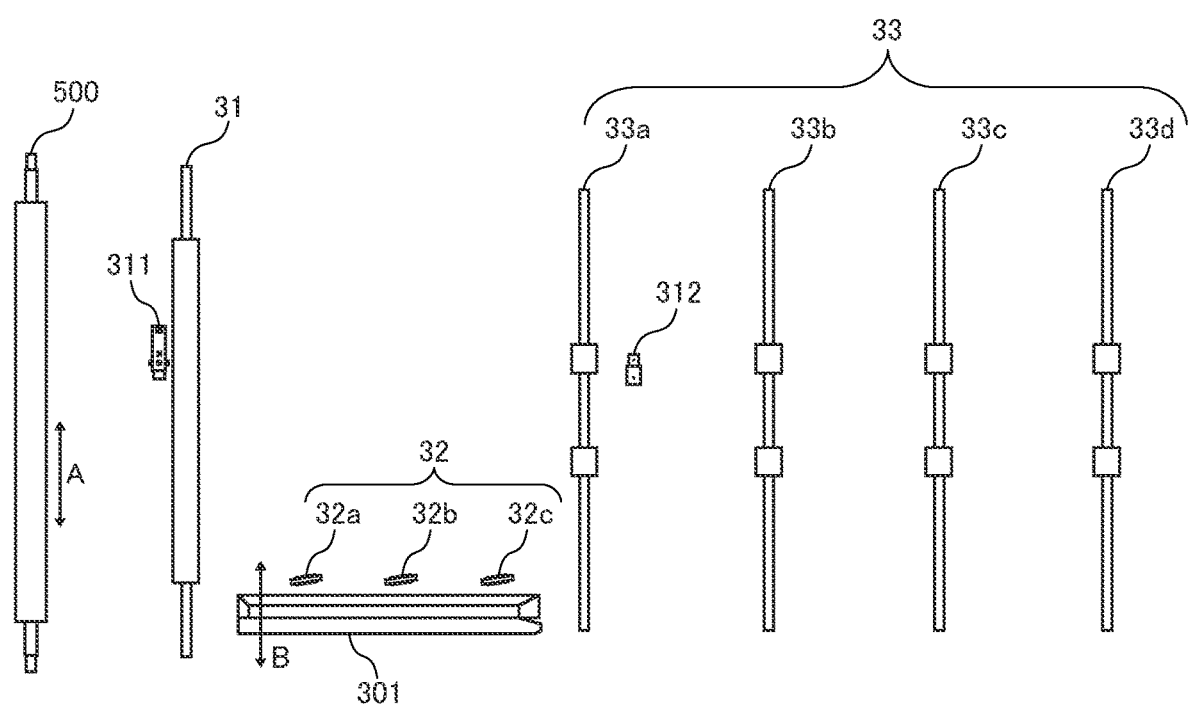
FIG. 4 is a top view of the registration unit of the present embodiment.
Figure 5:
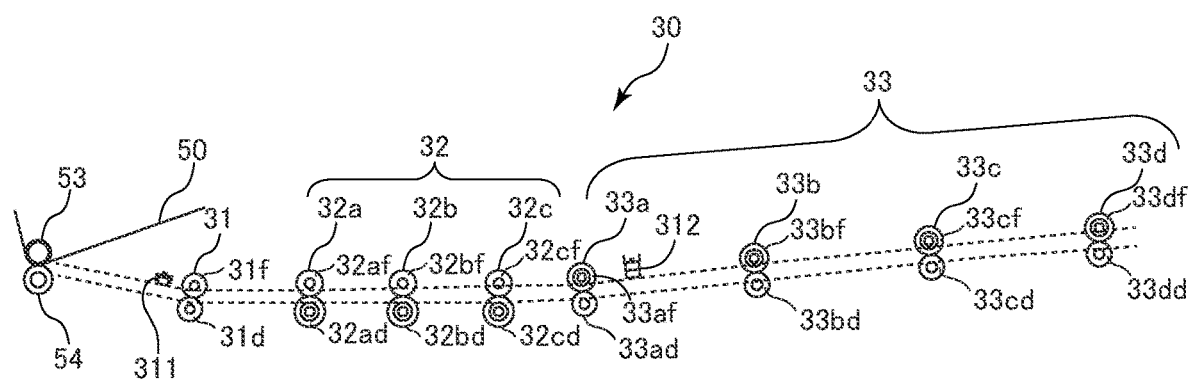
FIG. 5 is a cross-sectional view illustrating the registration unit of the present embodiment.

Next, a specific configuration of the registration unit 30 will be described in detail. FIG. 3 is a perspective view illustrating the registration unit 30 of the present embodiment. FIG. 4 is atop view illustrating the registration unit 30 of the present embodiment. FIG. 5 is a cross-sectional view illustrating the registration unit 30 of the present embodiment.

As illustrated in FIGS. 3 to 5, the plurality of conveyance roller pairs 33, the plurality of obliquely conveying roller pairs 32, the shift roller pair 31, and a secondary transfer roller pair 500 are arranged in sequence from upstream in the sheet conveyance direction in which the sheet is conveyed. The secondary transfer roller pair 500 is constituted by a pair of rollers including the secondary transfer inner and outer rollers 53 and 54.

Further, the shift roller pair 31, serving as a second roller pair, is constituted by a pair of rollers including a shift drive roller 31d and a shift driven roller 31f. The shift drive roller 31d is driven by the shift roller drive motor 31M described above, and a rotational speed of the shift drive roller 31d is controlled by the shift roller drive motor 31M. Further, the shift roller pair 31 is driven in an arrow A direction, which is the width direction, by the shift motor 31SM, and, thereby, moves the sheet so as to correct a position of the sheet in the width direction.

In the present embodiment, the plurality of obliquely conveying roller pairs 32 include three obliquely conveying roller pairs 32a, 32b, and 32c. To be noted, in the following descriptions, in a case where it is not necessary to discriminate these three obliquely conveying roller pairs, it is simply referred to as the obliquely conveying roller pairs 32. The obliquely conveying roller pair 32a, serving as a first roller pair, is constituted by a pair of rollers including an obliquely conveying drive roller 32ad and an obliquely conveying driven roller 32af. Further, similarly, the obliquely conveying roller pair 32b, serving as a third roller pair, is constituted by a pair of rollers including an obliquely conveying drive roller 32bd and an obliquely conveying driven roller 32bf. Further, similarly, the obliquely conveying roller pair 32c is constituted by a pair of rollers including an obliquely conveying drive roller 32cd and an obliquely conveying driven roller 32cf. The obliquely conveying roller drive motor 32M described above drives the obliquely conveying drive rollers 32ad, 32bd, and 32cd, and controls rotational speeds of these obliquely conveying drive rollers. Further, by the separation drive motor 32SM, it is possible to drive the obliquely conveying roller pairs 32 in such a manner that the obliquely conveying driven rollers 32af, 32bf, and 32cf are respectively separated from the obliquely conveying drive rollers 32ad, 32bd, 32cd in an arrow E direction (refer to FIG. 8B). That is, the obliquely conveying roller pairs 32 are switched between the nipping conveying state described above and the non-nipping state described above by the separation drive motor 32SM. To be noted, in the present embodiment, the obliquely conveying roller pair 32a arranged most downstream in the sheet conveyance direction is referred to as the first roller pair, and the obliquely conveying roller pair 32b arranged farther upstream than the obliquely conveying roller pair 32a in the sheet conveyance direction is referred to as the third roller pair.

That is, the obliquely conveying roller pair 32a, serving as the first roller pair, includes the obliquely conveying drive roller 32ad, serving as a first roller, and the obliquely conveying driven roller 32af, serving as a second roller. Further, the obliquely conveying roller pair 32a is capable of transiting between the nipping conveying state, serving as a contact state and a first contact state, in which the obliquely conveying drive roller 32ad and the obliquely conveying driven roller 32af can convey the sheet by coming into contact with each other, and the non-nipping state, serving as a separated state and a first separated state, in which the obliquely conveying drive roller 32ad and the obliquely conveying driven roller 32af are separated from each other. The obliquely conveying roller pair 32b, serving as the third roller pair, includes the obliquely conveying drive roller 32bd, serving as a third roller, and the obliquely conveying driven roller 32bf, serving as a fourth roller. Further, the obliquely conveying roller pair 32b is capable of transiting between the nipping conveying state, serving as a second contact state, in which the obliquely conveying drive roller 32bd and the obliquely conveying driven 32bf can convey the sheet by coming into contact with each other, and the non-nipping state, serving as a second separated state, in which the obliquely conveying drive roller 32bd and the obliquely conveying driven roller 32bf are separated from each other.

However, it is not limited to this, and, as long as an arrangement relationship is such that the first roller pair is arranged downstream of the third roller pair in the sheet conveyance direction, it is acceptable that the first and third roller pairs each are any one of the obliquely conveying roller pairs.

Further, on one side in the width direction of positions in which these obliquely conveying roller pairs 32 are arranged, the side abutment plate 301, serving as an abutment portion, is arranged movably in an arrow B direction that is the width direction. The side abutment plate 301 can come into contact with a first end portion in the arrow B direction of the sheet. That is, a position in the width direction of this side abutment plate 301 is controlled by being driven in the arrow B direction by the side abutment plate shift motor 301SM, and is set by being changed depending on the length of the sheet S in the width direction (size in the width direction) at the beginning of the print job.

In the present embodiment, the plurality of conveyance roller pairs 33 include four conveyance roller pairs 33a, 33b, 33c, and 33d. In the following descriptions, in a case where it is not necessary to discriminate these four conveyance roller pairs 33a, 33b, 33c, and 33d, it is simply referred to as the conveyance roller pairs 33. The conveyance roller pair 33a is constituted by a pair of rollers including a conveyance drive roller 33ad and a conveyance driven roller 33af. Further, similarly, the conveyance roller pair 33b is constituted by a pair of rollers including a conveyance drive roller 33bd and a conveyance driven roller 33bf. Further, similarly, the conveyance roller pair 33c is constituted by a pair of rollers including a conveyance drive roller 33cd and a conveyance driven roller 33cf. Then, similarly, the conveyance roller pair 33d is constituted by a pair of rollers including a conveyance drive roller 33dd and a conveyance driven roller 33df. The conveyance roller drive motor 33M described above drives the conveyance drive rollers 33a, 33b, 33c, and 33d, and controls rotational speeds of these conveyance drive rollers. Further, by the separation drive motor 32SM, it is possible to drive the conveyance roller pairs 33 such that the conveyance driven rollers 33af, 33bf, 33cf, and 33df are respectively separated from the conveyance drive rollers 33ad, 33bd, 33cd, and 33dd in an arrow D direction (refer to FIG. 7B). That is, the conveyance roller pairs 33 are switched between the nipping conveying state and the non-nipping state by the separation drive motor 32SM.

To be noted, adjacently to the downstream side in the sheet conveyance direction of the shift roller pair 31, the first leading edge detection sensor 311, serving as a sheet detection sensor, is arranged. Further, adjacently to the upstream side in the sheet conveyance direction of the conveyance roller pair 33a, the second leading edge detection sensor 312 is arranged. The first and second leading edge detection sensors 311 and 312 detect the leading edge of the sheet which is being conveyed. That is, a conveyance timing of the sheet S is detected by the first or second leading edge detection sensor 311 or 312. Further, in a case where the conveyance timing of the sheet S is later than a predetermined timing, it is judged that there is an abnormality, and the print job is stopped.

Overview of Conveyance Operation by Registration Unit

Figure 6A:
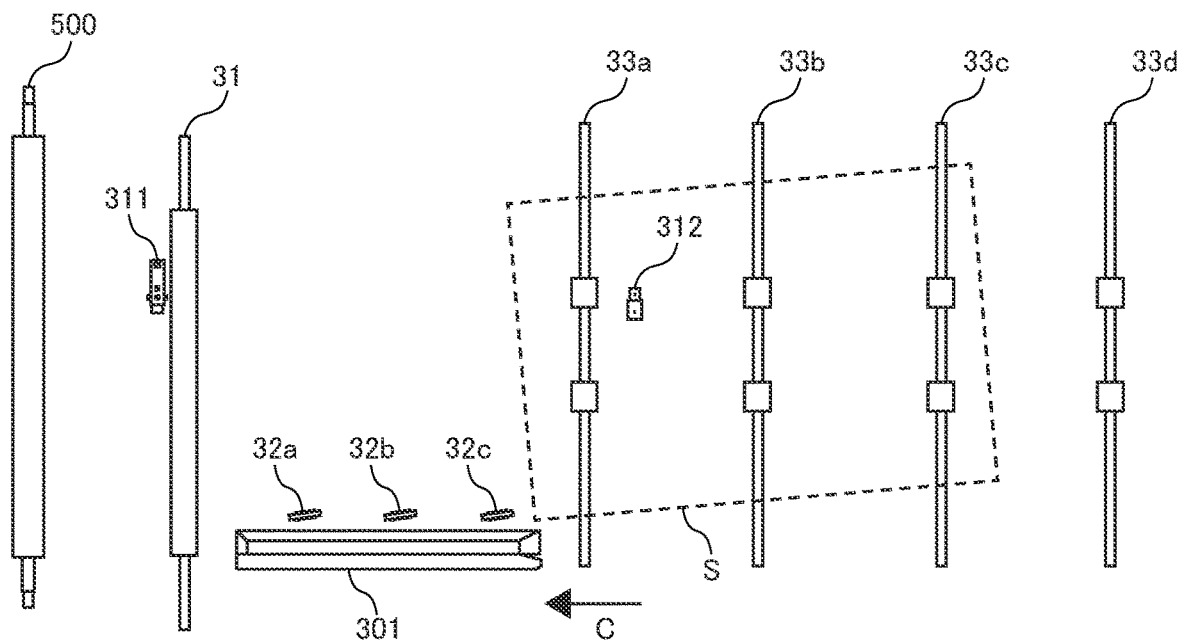
FIG. 6A is a top view illustrating a state in which a sheet is conveyed by conveyance roller pairs.
Figure 6B:
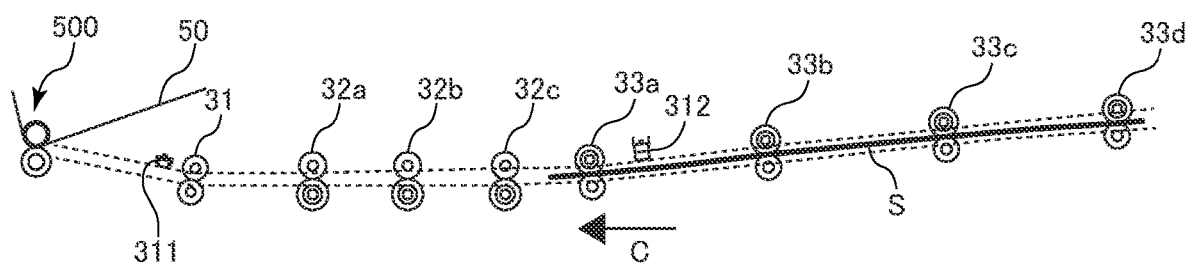
FIG. 6B is a cross-sectional view illustrating the state in which the sheet is conveyed by the conveyance roller pairs.
Figure 7A:
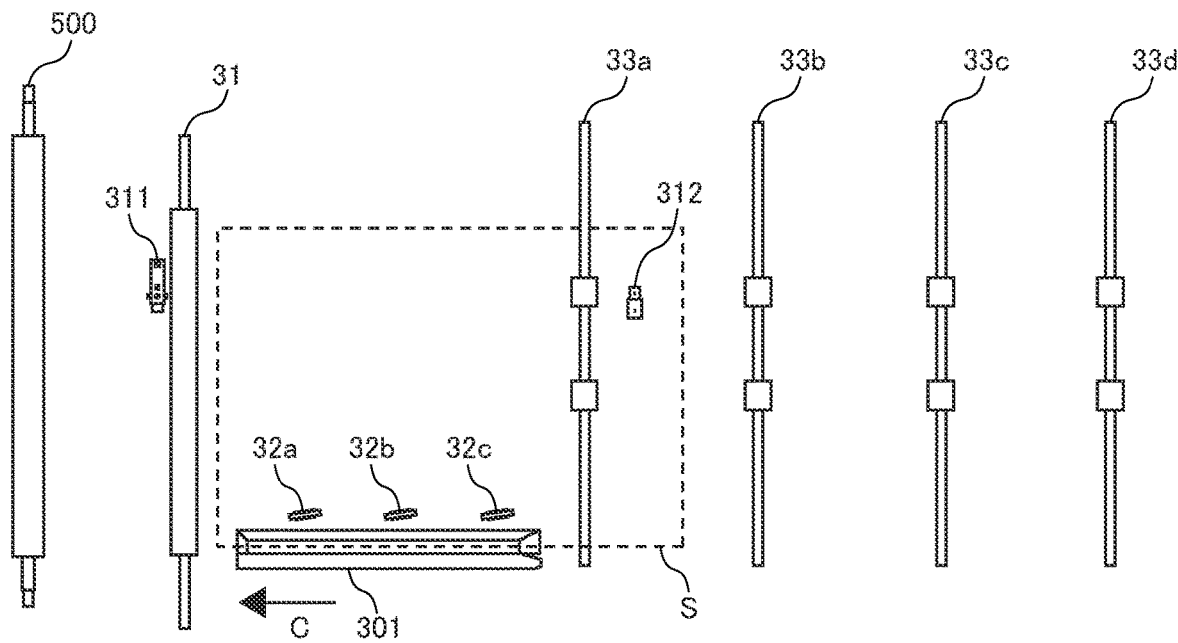
FIG. 7A is a top view illustrating a state in which the sheet is abutted against the side abutment plate by the obliquely conveying roller pairs.
Figure 7B:
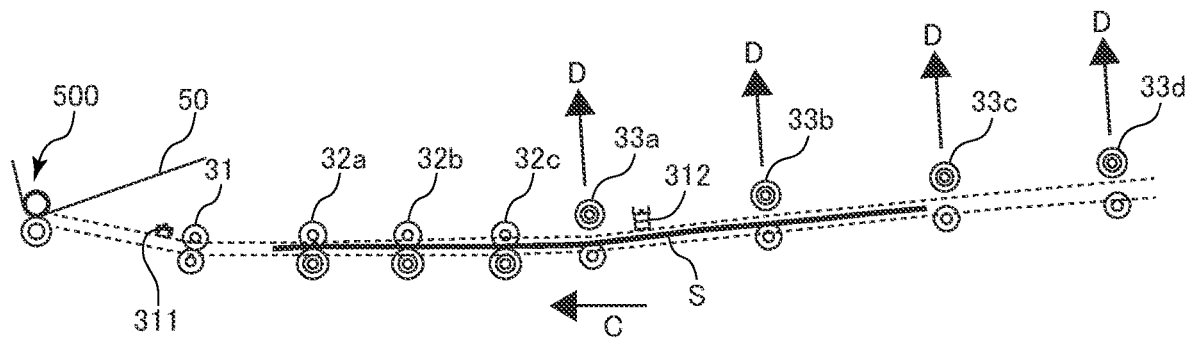
FIG. 7B is a cross-sectional view illustrating the state in which the sheet is abutted against the side abutment plate by the obliquely conveying roller pairs.
Figure 8A:
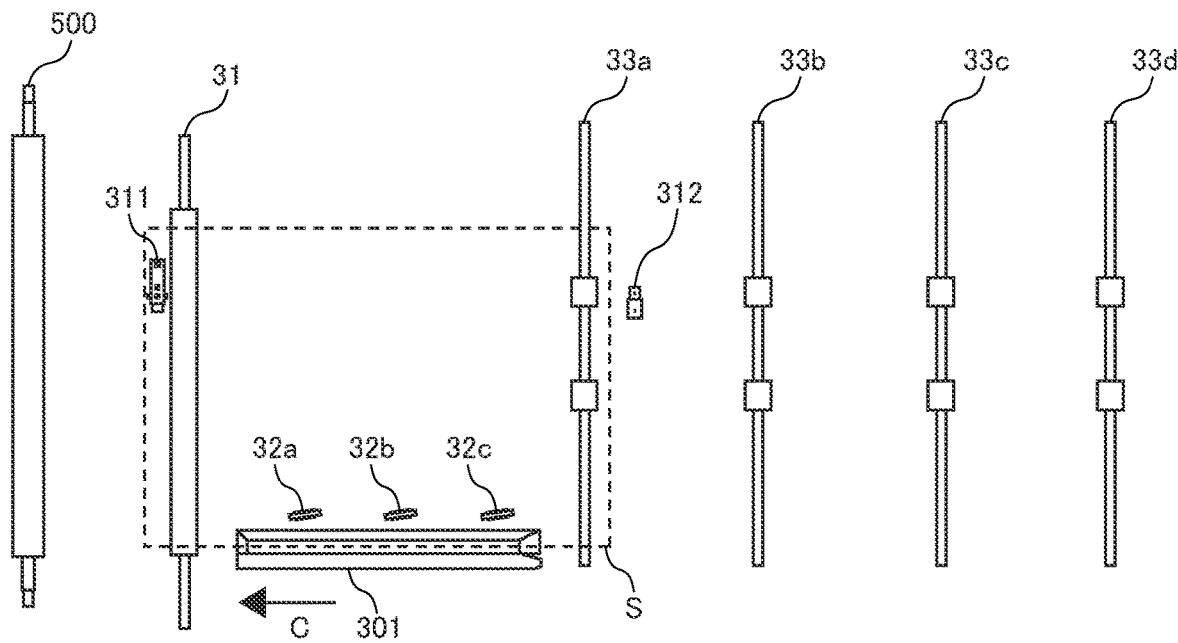
FIG. 8A is a top view illustrating a state in which the sheet is shifted in the width direction by the shift roller pair.
Figure 8B:
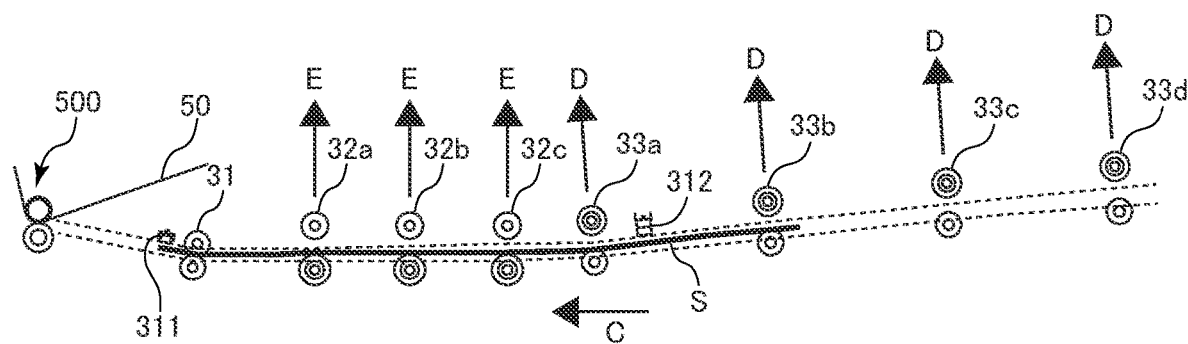
FIG. 8B is a cross-sectional view illustrating the state in which the sheet is shifted in the width direction by the shift roller pair.
Figure 9A:
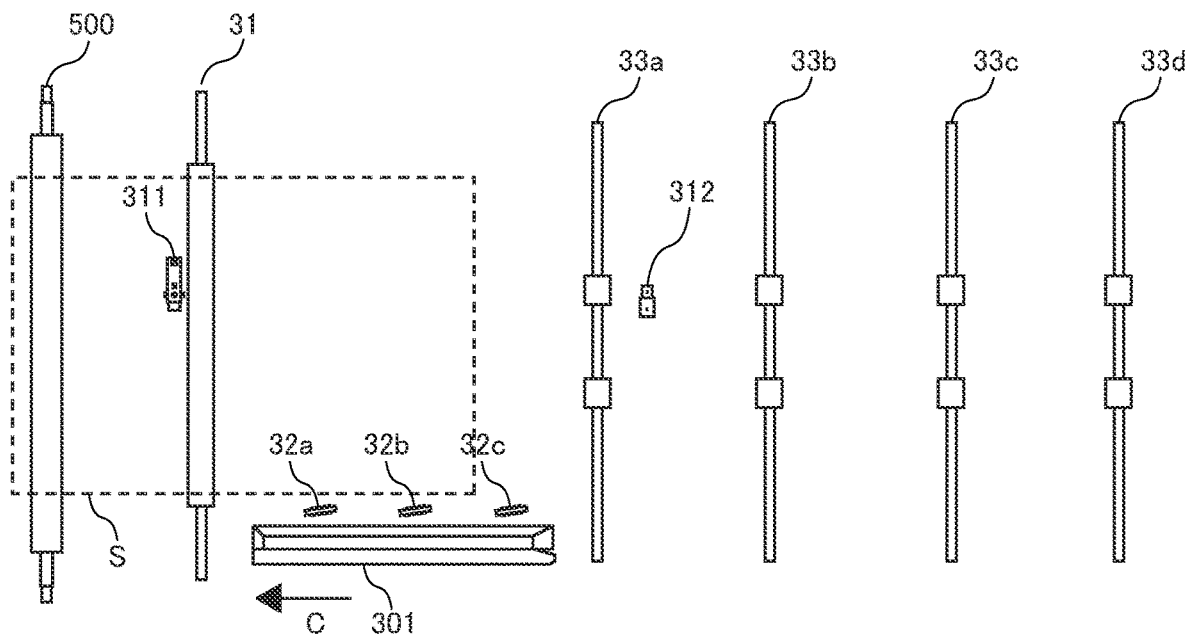
FIG. 9A is a top view illustrating a state in which the sheet has been conveyed to the secondary transfer roller pair.
Figure 9B:
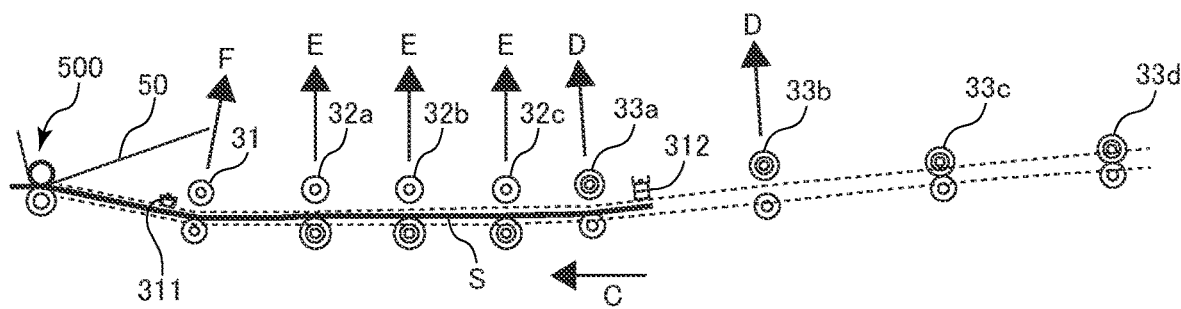
FIG. 9B is a cross-sectional view illustrating the state in which the sheet has been conveyed to the secondary transfer roller pair.

Next, using FIGS. 6A to 9B, a conveyance operation of the sheet S (operation for correcting the positional displacement and the skew of the sheet) in the registration unit 30 will be described. FIG. 6A is a top view illustrating a state in which the sheet is being conveyed by the conveyance roller pairs. FIG. 6B is a cross-sectional view illustrating the state in which the sheet is being conveyed by the conveyance roller pairs. FIG. 7A is a top view illustrating a state in which the sheet is abutted against the side abutment plate by the obliquely conveying roller pairs. FIG. 7B is a cross-sectional view illustrating the state in which the sheet is abutted against the side abutment plate by the obliquely conveying roller pairs. FIG. 8A is a top view illustrating a state in which the sheet has been conveyed to the shift roller pair by the obliquely conveying roller pairs. FIG. 8B is a cross-sectional view illustrating the state in which the sheet has been conveyed to the shift roller pair by the obliquely conveying roller pairs. FIG. 9A is a top view illustrating a state in which the sheet is being shifted in the width direction by the shift roller pair. FIG. 9B is a cross-sectional view illustrating the state in which the sheet is being shifted in the width direction by the shift roller pair.

As illustrated in FIGS. 6A and 6B, it is assumed that, for example, in the plurality of conveyance roller pairs 33a, 33b, 33c, and 33d, the sheet S is conveyed in an arrow C direction in a skewed state. In such a case, as illustrated in FIGS. 7A and 7B, when the sheet S reaches the obliquely conveying roller pairs 32a, 32b, and 32c, conveying force is applied to the sheet S also in the width direction in addition to the sheet conveyance direction, and the sheet S is conveyed while moving toward the side abutment plate 301. Since the obliquely conveying roller pairs 32a, 32b, and 32c slip when a side edge of the sheet S has abutted against the side abutment plate 301, the sheet S is rotated. Then, the sheet S aligns with the side abutment plate 301, and the skew of the sheet S is corrected.

To be noted, as illustrated in FIG. 7B, at a time correcting the skew by the obliquely conveying roller pairs 32a, 32b, and 32c, the conveyance driven rollers 33af, 33bf, 33cf, and 33df each are separated from the respective conveyance drive rollers in the arrow D direction, and the conveyance roller pairs 33a, 33b, 33c, and 33d arranged upstream of the obliquely conveying roller pairs 32a, 32f, and 32c in the sheet conveyance direction are brought into the non-nipping state. That is, if the conveyance roller pairs 33a, 33b, 33c, and 33d are not in the separated state, since the sheet S is nipped by the conveyance roller pairs 33a, 33b, 33c, and 33d, the sheet S is not able to move in the width direction, and is not able to align with the side abutment plate 301. Therefore, by separating the driven rollers from the drive rollers in the conveyance driven roller pairs 33a, 33b, 33c, and 33d, it is possible to convey the sheet S in a manner of aligning with the side abutment plate 301.

Thereafter, as illustrated in FIGS. 8A and 8B, the first leading edge detection sensor 311 detects that the leading edge of the sheet S has reached the shift roller pair 31. Then, as illustrated in FIG. 9A, the shift roller pair 31 is shifted in the arrow A direction so as to align a position, in the width direction, of the sheet S to a position, in the width direction, of the image to be transferred in the secondary transfer roller pair 500. Thereby, the positional displacement in the width direction of the sheet S is corrected. Further, the control unit 200 compares a timing in which the first leading edge detection sensor 311 has detected the leading edge of the sheet S with a timing in which the toner image will reach the secondary transfer roller pair 500. Then, so as to match timings of the sheet S and the toner image each other, the control unit 200 controls a timing for decelerating the rotational speed of the shift roller pair 31. As described above, by the timing for decelerating the rotational speed of the shift roller pair 31, a transfer position, in the sheet conveyance direction, of the toner image to be transferred onto the sheet S is adjusted.

To be noted, as illustrated in FIG. 8B, at a time of shifting the sheet S in the width direction by the shift roller pair 31, the obliquely conveying driven rollers 32af, 32bf, and 32cf are separated from the respective obliquely conveying drive rollers in the arrow E direction, and the obliquely conveying roller pairs 32a, 32b, and 32c are brought into the non-nipping state so as not to generate a twist in the sheet S.

Then, as illustrated in FIGS. 9A and 9B, when the sheet S has been conveyed to the secondary transfer roller pair 500, also the shift driven roller 31f is separated from the shift drive roller 31d in an arrow F direction. During the conveyance of the sheet S by the secondary transfer roller pair 500, the driven rollers of all of the roller pairs located upstream of the secondary transfer roller pair 500 in the sheet conveyance direction are separated from the respective drive rollers, and all of the roller pairs are brought into the non-nipping state. Thereby, since the sheet S conveyed by the secondary transfer roller pair 500 becomes not affected by the roller pairs located upstream of the secondary transfer roller pair 500 in the sheet conveyance direction, it is possible to convey the sheet S with high accuracy without causing any speed variations of the sheet S.

Details of Sheet Conveyance Control of Present Embodiment

Figure 10:
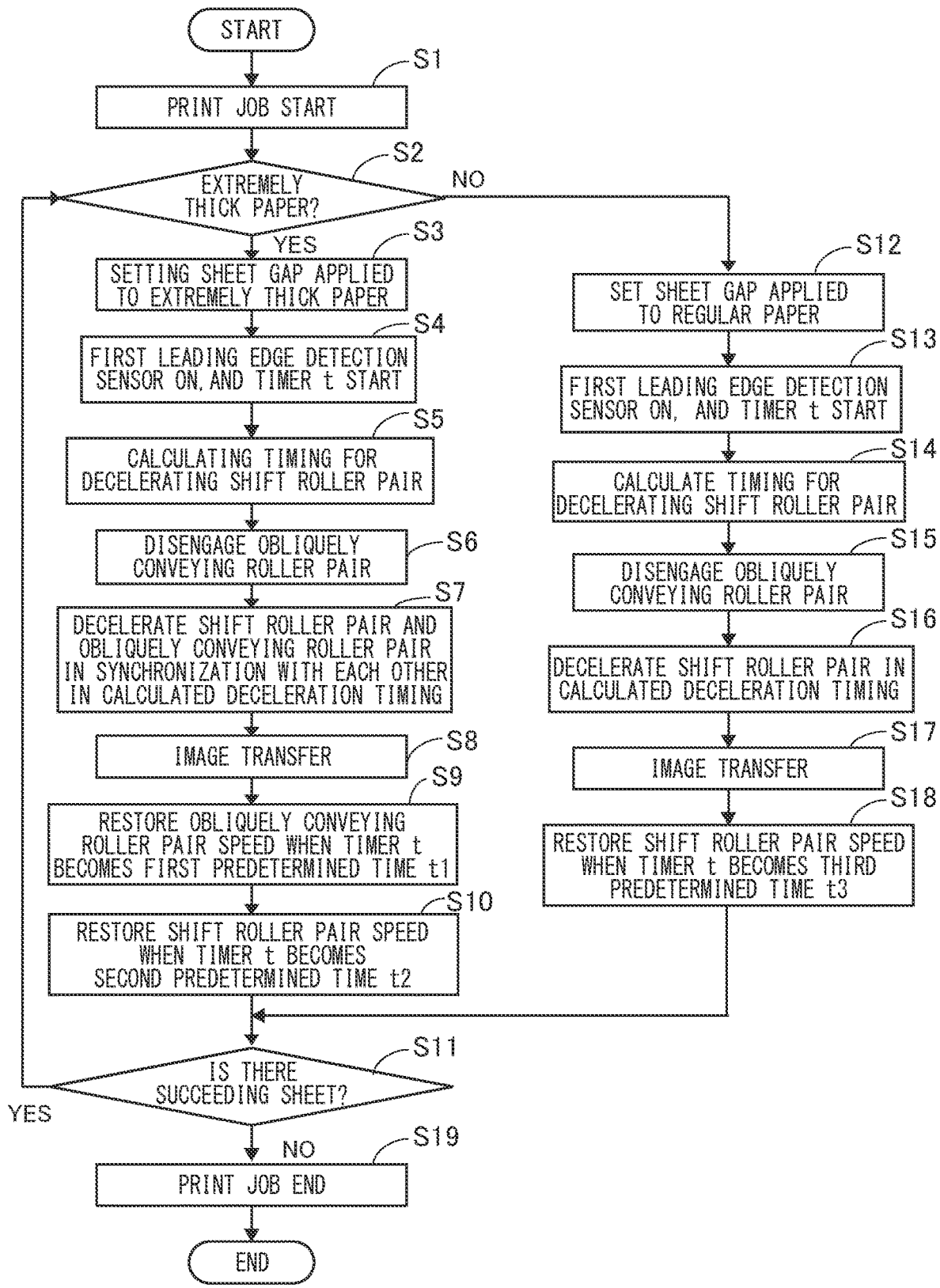
FIG. 10 is a flowchart illustrating the sheet conveyance control of the present embodiment.
Figure 11A:
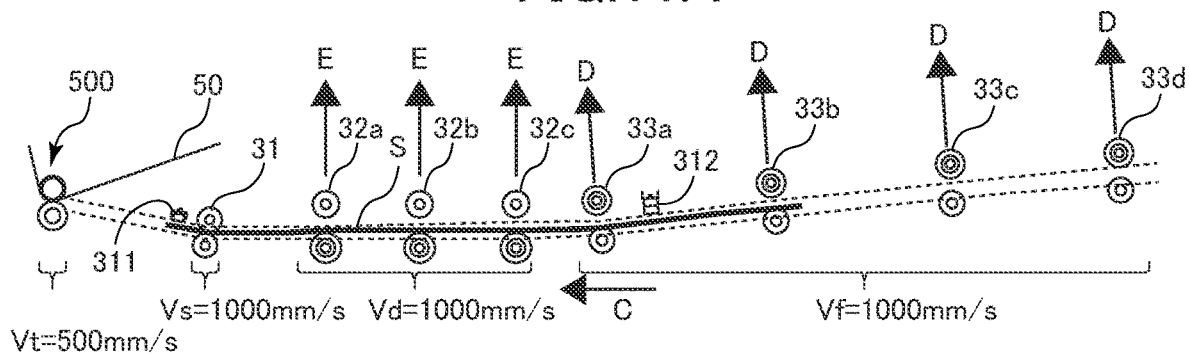
FIG. 11A is a cross-sectional view illustrating a state in which a leading edge of the sheet is detected by a first sheet detection sensor in a first mode of the present embodiment.
Figure 11B:
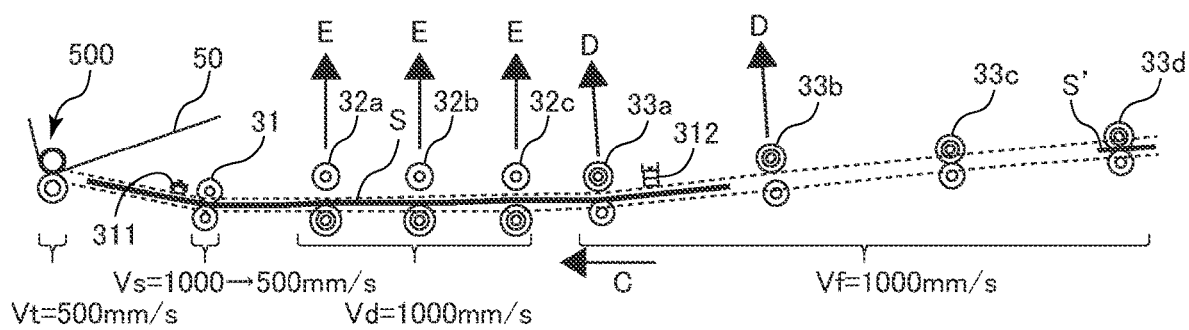
FIG. 11B is a cross-sectional view illustrating a state immediately before, in the first mode of the present embodiment, the leading edge of the sheet reaches a secondary transfer nip.
Figure 11C:
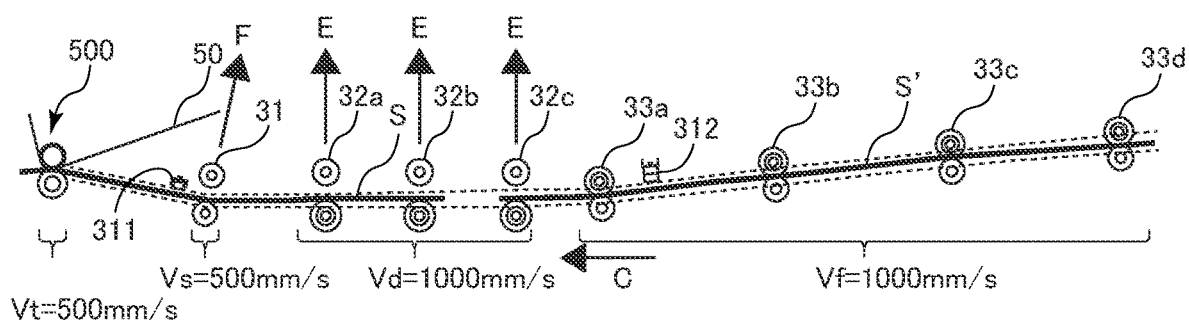
FIG. 11C is a cross-sectional view illustrating a state in which, in the first mode of the present embodiment, a trailing edge of the sheet is passing through the obliquely conveying roller pairs.
Figure 12:
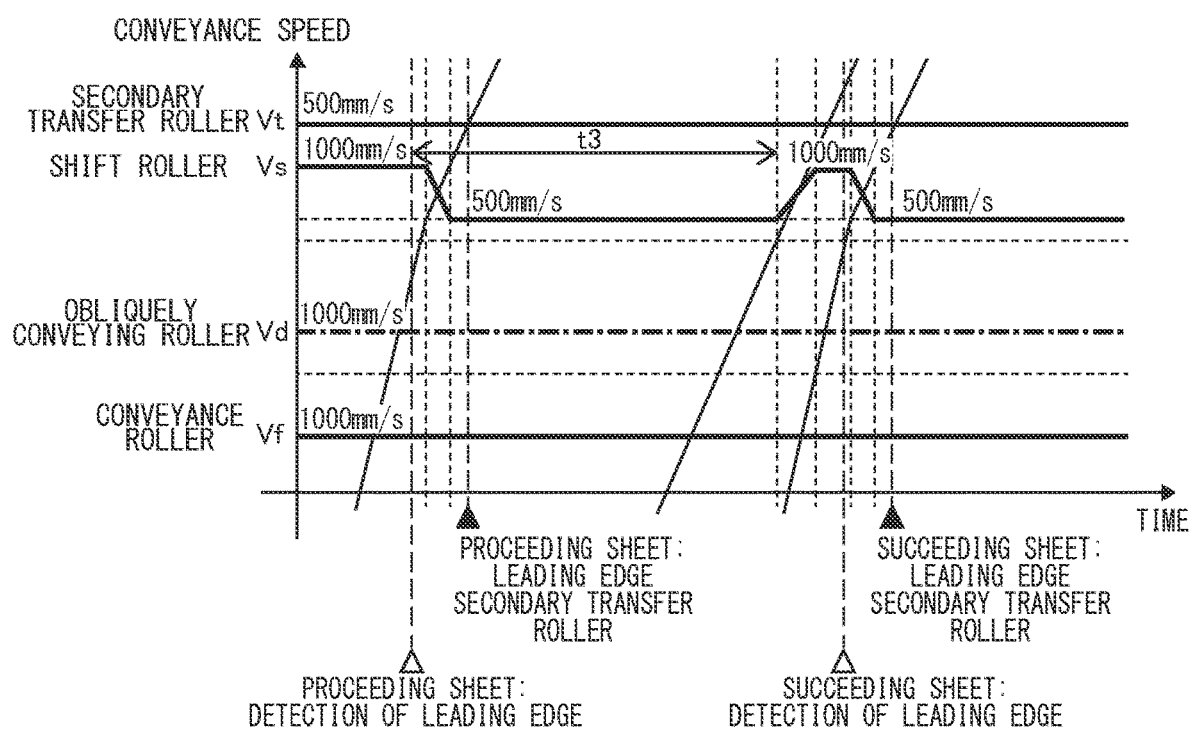
FIG. 12 is a time chart illustrating passing positions of sheets and a rotational speed of each roller in the first mode of the present embodiment.
Figure 13:
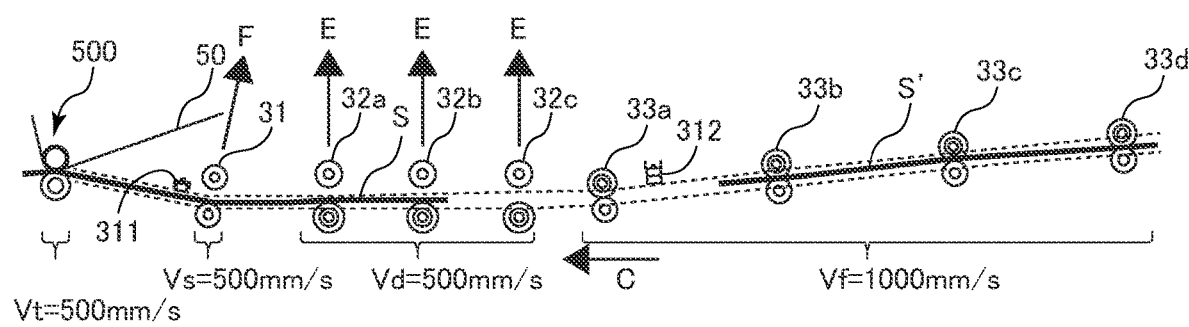
FIG. 13 is a cross-sectional view illustrating a state in which, in a second mode of the present embodiment, the trailing edge of the sheet is passing through the obliquely conveying roller pairs.
Figure 14:
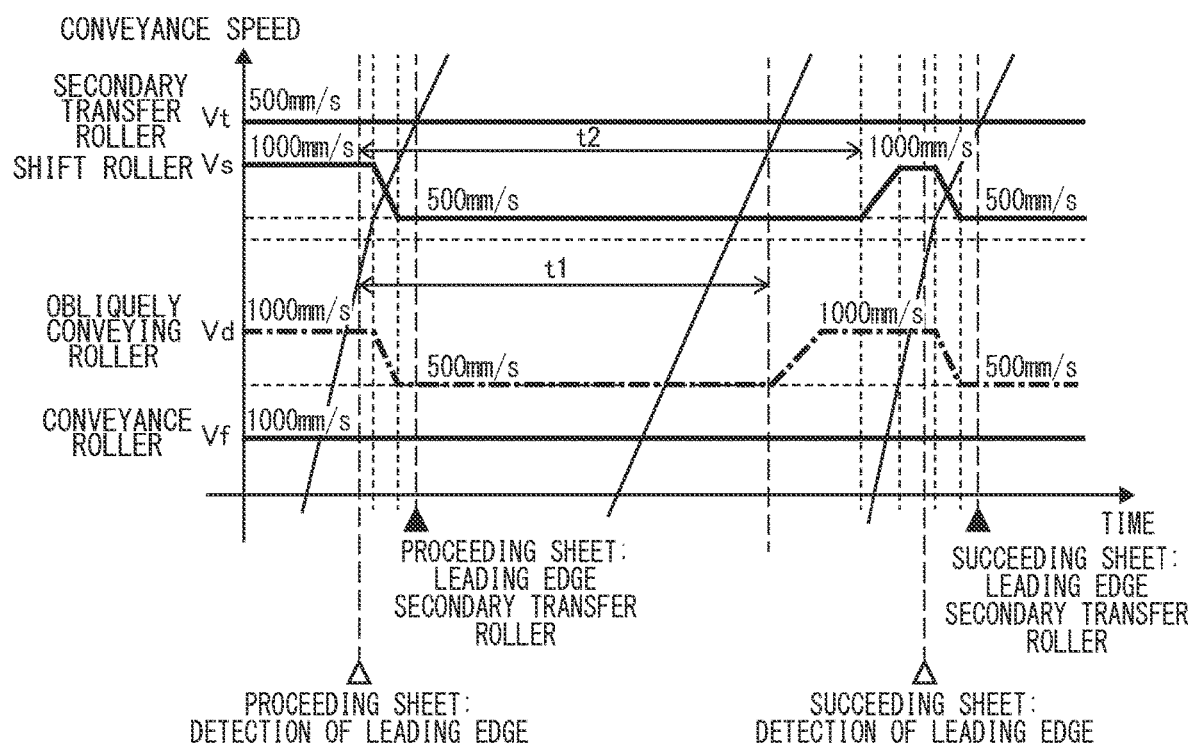
FIG. 14 is a time chart illustrating passing positions of the sheets and a rotational speed of each roller in the second mode of the present embodiment.
Figure 15A:
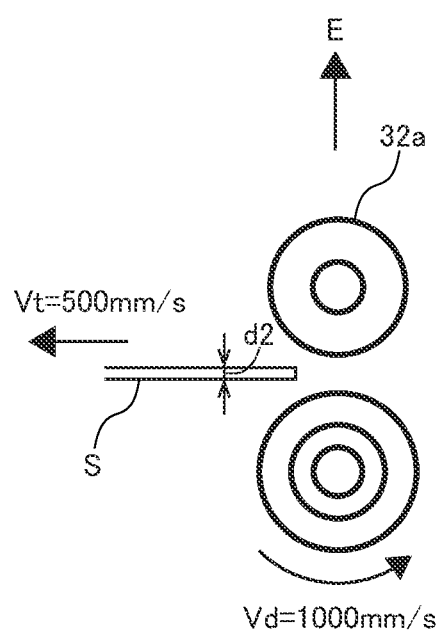
FIG. 15A is a cross-sectional view illustrating a case where a trailing edge of regular paper passes through the obliquely conveying roller pair whose rotational speeds are maintained.
Figure 15B:
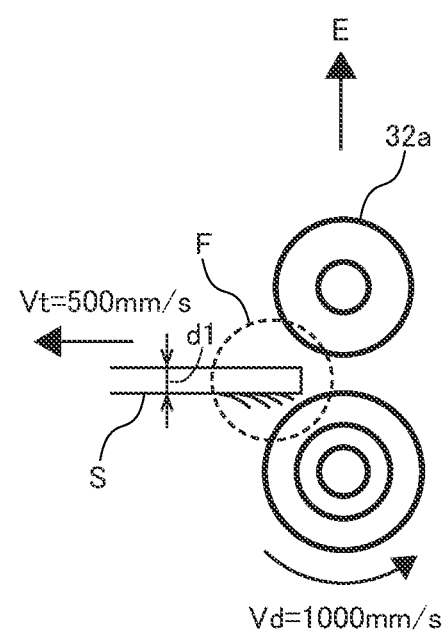
FIG. 15B is a cross-sectional view illustrating a case where a trailing edge of extremely thick paper passes through one of the obliquely conveying roller pairs whose rotational speeds are maintained.

Next, using FIGS. 10 to 15B, details of the sheet conveyance control of the present embodiment will be described. FIG. 10 is a flowchart illustrating the sheet conveyance control of the present embodiment. FIG. 11A is a cross-sectional view illustrating a state in which the leading edge of the sheet has been detected by the first leading edge detection sensor 311 in a first mode of the present embodiment. FIG. 11B is a cross-sectional view illustrating a state in which the leading edge of the sheet is immediately before reaching the secondary transfer nip T2 in the first mode of the present embodiment. FIG. 11C is a cross-sectional view illustrating a state in which a trailing edge of the sheet is passing through the obliquely conveying roller pairs 32 in the first mode of the present embodiment. FIG. 12 is a time chart illustrating passing positions of the sheet and a rotational speed of each roller in the first mode of the present embodiment. FIG. 13 is a cross-sectional view illustrating a state in which the trailing edge of the sheet is passing through the obliquely conveying roller pairs 32 in a second mode of the present embodiment. FIG. 14 is a time chart illustrating passing positions of sheets and a rotational speed of each roller in the second mode of the present embodiment. FIG. 15A is a cross-sectional view illustrating a case where a trailing edge of regular paper is passing through the obliquely conveying roller pairs 32 whose rotational speeds are maintained. FIG. 15B is a cross-sectional view illustrating a case where a trailing edge of extremely thick paper is passing through the obliquely conveying roller pairs 32 whose rotational speeds are maintained.

First, a case of conveying the regular paper, which is a sheet other than the extremely thick paper, by the registration unit 30 will be described using FIGS. 10 to 12. As illustrated in FIG. 10, the control unit 200 of the printer 1 starts the print job upon receiving instructions for print execution from the user via, for example, the computer 300 (refer to FIG. 2) (STEP 1). To be noted, along with instructing such as the number of prints from, for example, the computer 300, the user specifies such as a type of sheet S used for printing.

In the present embodiment, the control unit 200 selectively executes either the first mode or the second mode, described in detail below, depending on whether the sheet is the extremely thick paper or paper other than the extremely thick paper. That is, the extremely thick paper is the paper such as the paper board and cardboard having the sheet thickness of a first thickness. Further, the paper other than the extremely thick paper is paper such as thin paper, the regular paper, and normal cardboard having the thinner thickness of a second thickness than the first thickness. First, upon receiving the start instructions for the print job, the control unit 200 judges whether the type of the sheet S is the extremely thick paper or the paper other than the extremely thick paper (STEP S2). Since, here, the sheet S is the regular paper and is the paper other than the extremely thick paper (STEP S2: No), the second mode which is a mode to perform steps from STEP S12 to STEP S18 is performed.

Second Mode

Since, as described above, the type of the sheet S has been judged as the regular paper, the control unit 200, first, proceeds to STEP S12, and starts the conveyance of the sheet S by setting a distance (so-called sheet gap), which is a distance between sheets at a time of conveying a plurality of sheets, at a distance applied to the regular paper. Then, as illustrated in FIGS. 11A and 12, the control unit 200 sets sheet conveyance speeds of the conveyance roller pairs 33a, 33b, 33c, and 33d at a conveyance speed Vf=1000 millimeters (mm)/second (s). Further, the control unit 200 sets sheet conveyance speeds of the obliquely conveying roller pairs 32a, 32b, and 32c at a conveyance speed Vd=1000 mm/s. Then, the control unit 200 sets a sheet conveyance speed of the shift roller pair 31 at a conveyance speed Vs=1000 mm/s. To be noted, a conveyance speed of the secondary transfer roller pair 500 is being set at a conveyance speed Vt=500 mm/s that is an image forming speed.

As described above, the sheet S is conveyed to the shift roller pair 31 with the skew of the sheet S corrected as described above (refer to FIGS. 6A to 8B). Hereinafter, a processing in which, as described above, the obliquely conveying roller drive motor 32M and the shift roller drive motor 31M are controlled such that the conveyance speeds (rotational speeds) of the obliquely conveying roller pairs 32a, 32b, and 32c and the shift roller pair 31 become 1000 mm/s (first rotational speed), and in which the sheet is conveyed to the shift roller pair 31 by the obliquely conveying roller pairs 32a, 32b, and 32c, which are in the nipping conveying state, is referred to as a first processing. Then, when the first leading edge detection sensor 311 has detected the leading edge of the sheet S, the control unit 200 starts the time measurement of a timer t (STEP S13). At this time, upon receiving this detection of the leading edge of the sheet S, as described above, the control unit 200 calculates the timing for decelerating the shift roller pair 31 in accordance with a timing in which timings of the sheet S and the toner image are aligned with each other at the secondary transfer roller pair 500 (STEP S14). Further, at this time, upon receiving this detection of the leading edge of the sheet S, the control unit 200 disengages the driven and drive rollers of the obliquely conveying roller pairs 32a, 32b, and 32c, and switches the obliquely conveying roller pairs 32 to the non-nipping state. Hereinafter, a processing in which, as described above, the obliquely conveying roller pairs 32a, 32b, and 32c transits from the nipping conveying state to the non-nipping state, is referred to as a second processing.

As illustrated in FIGS. 11B and 12, in the calculated timing for decelerating the shift roller pair 31, the control unit 200 decelerates the conveyance speed of the shift roller pair 31 from the conveyance speed Vs=1000 mm/s to the conveyance speed Vs=500 mm/s that is the image forming speed (STEP S16). That is, in a case where a timing in which the first leading edge detection sensor 311 described above has detected the leading edge of the sheet S is later than a normal timing, the control unit 200 delays the timing for decelerating the shift roller pair 31 by that extent. On the contrary, in a case where the timing in which the first leading edge detection sensor 311 described above has detected the leading edge of the sheet S is earlier than the normal timing, the control unit 200 advances the timing for decelerating the shift roller pair 31 by that extent. To be noted, it is possible to use the timer t described above for the time measurement of this timing.

As described above, when the sheet S has been conveyed to the secondary transfer roller pair 500 with a timing for conveying the sheet S to the secondary transfer roller pair 500 adjusted by the shift roller pair 31, the toner image (image) is accurately transferred onto a printing position of the sheet S (STEP S17).

Thereafter, when the timer t has become a third predetermined time t3 that is a time after the trailing edge of the sheet S has passed through the shift roller pair 31 and before a leading edge of a succeeding sheet reaches the shift roller pair 31, the control unit 200 restores the conveyance speed of the shift roller pair 31 (STEP S18). That is, the control unit 200 accelerates the sheet conveyance speed of the shift roller pair 31 from the conveyance speed Vs=500 mm/s to the conveyance speed Vs=1000 mm/s. Thereby, the sheet conveyance control for a single sheet of the sheet S by the second mode is completed, and the control unit 200 judges whether or not there is the succeeding sheet (succeeding sheet S') (STEP S11). In a case where there is the succeeding sheet (STEP S11: Yes), the control unit 200 returns to STEP S2, and, if the succeeding sheet is, for example, the same regular paper, the control unit 200, again, performs the sheet conveyance control by the second mode. Then, in a case where there is not the succeeding sheet (STEP S11: No), the control unit 200 ends the print job (STEP S19) with the steps described above, and ends this sheet conveyance control.

As described above, in the sheet conveyance control by the second mode, by conveying the sheet S to the shift roller pair 31 at a faster speed than the image forming speed in the secondary transfer roller pair 500 and by decelerating the sheet conveyance speed to the image forming speed by the shift roller pair 31, it is possible to perform accurate image formation while improving productivity.

Incidentally, during a time of performing the skew correction by conveying the sheet S as described above, since the obliquely conveying roller pairs 32*a*, 32*b*, and 32*c* convey the sheet S while abutting the sheet against the side abutment plate 301, the obliquely conveying roller pairs 32*a*, 32*b*, and 32*c* convey the sheet S while slipping. Therefore, during the conveyance of the sheet S by the obliquely conveying roller pairs 32*a*, 32*b*, and 32*c*, variations in the conveyance speed of the sheet S tend to increase. Against this, as described in the present embodiment, the first leading edge detection sensor 311 detects the arrival of the leading edge of the sheet S at the shift roller pair 31, and, in accordance with this detection, the control unit 200 calculates the timing for conveying the sheet S to the secondary transfer roller pair 500, and controls the conveyance speed of the sheet S. As described above, the timing for decelerating the shift roller pair 31 is controlled immediately before the sheet S reaches the secondary transfer roller pair 500. Thereby, even if the conveyance timing of the sheet S by the obliquely conveying roller pairs 32*a*, 32*b*, and 32*c* varies, it is possible to accurately control the timing in which the sheet S is conveyed to the secondary transfer roller pair 500 (toner image).

To be noted, the conveyance speed Vs of the shift roller pair 31 and the conveyance speed Vt of the secondary transfer roller pair 500 are respectively set at 1000 mm/s and 500 mm/s. However, since, even if a delay amount of the sheet S is large, it is possible to recover from a delay of the sheet S easier the greater a difference between these conveyance speeds is, it is acceptable to further increase the speed difference. Thereby, even if a variation amount in the conveyance timing by the obliquely conveying roller pairs 32 is increased further, it becomes possible to allow such a variation amount.

Productivity Improvement in Conveyance of Succeeding Sheet

Next, productivity improvement in a case of where the print job instructs printing of a plurality of sheets and the image formation is performed continuously on the succeeding sheets will be described. For example, in a case where the image formation is performed continuously on a plurality of sheets of the regular paper, the second mode (STEPS S12 to S18) described above is performed repeatedly (STEP S11: Yes). Here, as illustrated in FIG. 11B, in a case where the succeeding sheet S' is conveyed, in a timing in which the proceeding sheet S has passed through the conveyance roller pairs 33*a*, 33*b*, 33*c*, and 33*d*, these conveyance roller pairs are returned from the non-nipping state to the nipping conveying state in sequence. Then, as illustrated in FIG. 11C, the succeeding sheet S' is conveyed at the conveyance speed Vt=1000 mm/s by the conveyance roller pairs 33*a*, 33*b*, 33*c*, and 33*d*, and, thereafter, as with the proceeding sheet S, conveyed to the obliquely conveying roller pairs 32 and the shift roller pair 31.

That is, as illustrated in FIG. 11B, until the proceeding sheet S is decelerated, a distance between the proceeding sheet S and the succeeding sheet S' is wide. However, when the proceeding sheet S is decelerated to the image forming speed, the conveyance speed of the proceeding sheet S becomes 500 mm/s, and the conveyance speed of the succeeding sheet S' becomes 1000 mm/s. Therefore, as illustrated in FIG. 11C, by a time in which the succeeding sheet S' reaches the obliquely conveying roller pairs 32*a*, 32*b*, and 32*c*, the distance between the proceeding sheet S and the succeeding sheet S' becomes narrow.

Since, as described above, during the conveyance of the proceeding sheet S by the obliquely conveying roller pairs 32*a*, 32*b*, and 32*c*, the variations in the conveyance speed are large, the timing for the conveyance to the secondary transfer roller pair 500 is controlled by the shift roller pair 31. Therefore, the sheet gap has been increased such that the proceeding sheet S and the succeeding sheet S' do not interfere with each other. It is possible to achieve high productivity by controlling the sheet gap such that, after the proceeding sheet S has reached the secondary transfer roller pair 500 and the conveyance speed has been stabilized at the image forming speed, the distance between the proceeding sheet S and the succeeding sheet S' is decreased by the difference between the conveyance speeds of the proceeding sheet S and the succeeding sheet S'. In other words, for example, even if all of the roller pairs are controlled at the same speed of 500 mm/s, taking into consideration the variations (deceleration) in the conveyance speed generated during the conveyance by the obliquely conveying roller pairs 32*a*, 32*b*, and 32*c*, it is necessary to have increased the distance between the sheets. Therefore, by controlling the conveyance speeds of the obliquely conveying roller pairs 32*a*, 32*b*, and 32*c* at 1000 mm/s and by decelerating the sheet S by the shift roller pair 31 immediately before the secondary transfer roller pair 500, it is possible to decrease the distance between the sheet S and the sheet S', and possible to achieve the high productivity.

Then, the conveyance speed Vs of the sheet S is decelerated to 500 mm/s by the shift roller pair 31, and, during a time in which the sheet S is being conveyed at the image forming speed by the secondary transfer roller pair 500, the conveyance speeds Vd of the obliquely conveying roller pairs 32*a*, 32*b*, and 32*c* are maintained at 1000 mm/s. That is, in STEP S16, serving as third processing, along with controlling the shift roller drive motor 31M such that the conveyance speed (rotational speed) of the shift roller pair 31 is decelerated from 1000 mm/s (first rotational speed) to 500 mm/s (second rotational speed), the control unit 200 maintains the conveyance speeds (rotational speeds) of the obliquely conveying roller pairs 32*a*, 32*b*, and 32*c* at 1000 mm/s which is a higher speed than 500 mm/s. As described above, the second mode at least includes the first, second, and third processing described above. Thereby, after the trailing edge of the sheet S has passed through the obliquely conveying roller pairs 32*a*, 32*b*, and 32*c*, it is possible to bring the obliquely conveying roller pairs 32*a*, 32*b*, and 32*c* into a state capable of immediately nipping and conveying the succeeding sheet S'.

Problem during Conveyance of Extremely Thick Paper

Next, using FIGS. 15A and 15B, a problem occurred in a case where the conveyance speed of the sheet S is decelerated to 500 mm/s by the shift roller pair 31 and the conveyance speeds of the obliquely conveying roller pairs 32*a*, 32*b*, and 32*c* are maintained at 1000 mm/s will be described. To be noted, while, in FIGS. 15A and 15B, the obliquely conveying roller pair 32*a* is illustrated as a representative, the same is applied to also the obliquely conveying roller pairs 32*b* and 32*c*.

For example, in a case where the sheet S is the extremely thick paper such as the paper board and the cardboard, when the trailing edge of the sheet S passes through the obliquely conveying roller pairs 32, even if the obliquely conveying roller pairs 32 are disengaged, one sides of obliquely conveying roller pairs 32 are likely to come into contact with the surface of sheet S. At this time, if a difference between the conveyance speed of the sheet S and the conveyance speed Vd of the obliquely conveying roller pairs 32 is large, sometimes, the trailing edge of the sheet S is soiled, and a trailing edge surface of the sheet S is scratched due to the generation of such as an edge curl.

In particular, as illustrated in FIG. 15A, in a case where, for example, the sheet S has a thickness d2, which is the second thickness, and is a sheet other than the extremely thick paper, such as the thin paper, the regular paper, and the normal cardboard, in a state in which the obliquely conveying roller pair 32a is disengaged so as to be brought into the non-nipping state, there is a sufficient distance between the sheet S and the obliquely conveying roller pair 32a. Therefore, even if the difference between the conveyance speed of the sheet S and the conveyance speed Vd of the obliquely conveying roller pair 32a is large, the trailing edge of the sheet S is not soiled, and the trailing edge surface of the sheet S is not scratched.

However, as illustrated in FIG. 15B, in a case where the sheet S is the extremely thick paper such as the paper board and the cardboard having a thickness d1, which is the first thickness thicker than the second thickness d2, even if the obliquely conveying roller pair 32a is disengaged so as to be brought into the non-nipping state, the distance between the sheet S and the obliquely conveying roller pair 32a is small. Therefore, there is a possibility of soiling of the trailing edge of the sheet S and scratching of the trailing edge surface of the sheet S, and, especially, if the difference between the conveyance speed of the sheet S and the conveyance speed Vd of the obliquely conveying roller pair 32a is large, there is the fear that the edge curl may be generated as illustrated in a portion F in FIG. 15B.

In particular, so as to abut the sheet S against the side abutment plate 301, the obliquely conveying roller pairs 32 are arranged such that a rotational direction of each of the obliquely conveying roller pairs is slanted with respect to the conveyance direction. While, in a case where rotational directions of roller pairs are arranged straightly with respect to the conveyance direction, the trailing edge of the sheet S and surfaces of roller pairs rub each other, and, in the case of arranging the rotational directions of the roller pairs obliquely with respect to the conveyance direction, the trailing edge of the sheet S and edges of ends of the roller pairs rub each other. Therefore, there is a problem that possibilities of soiling of the trailing edge of the sheet S and scratching on the trailing edge surface of the sheet S become higher. Hereinafter, the first mode of the sheet conveyance control for resolving such a problem will be described.

To be noted, while there are various definitions for the paper board and cardboard as the extremely thick paper and Japanese Industrial Standard (JIS) defines that paper having equal to or larger than 225 grams (g)/square meter (mm$^2$) is sometimes regarded as the paper board, in the present embodiment, paper having a grammage exceeding, for example, 400 g/m$^2$ is defined as the extremely thick paper.

First Mode

As described above, when the control unit 200 has received the instructions for the print execution from the user via, for example, the computer 300 (refer to FIG. 2), the control unit 200 starts the print job (STEP S1) as illustrated in FIG. 10. Then, upon starting the print job, the control unit 200 judges whether the type of the sheet S is the extremely thick paper or a sheet other than the extremely thick paper (STEP S2). Here, it is assumed that the sheet S is the extremely thick paper (STEP S2: Yes), and the first mode which is a mode to perform steps from STEP S3 to STEP S10 is executed.

Since the type of the sheet S has been judged as the extremely thick paper, the control unit 200 proceeds to STEP S3, and starts the conveyance of the sheet S by setting the distance (so-called sheet gap) between sheets at a time of conveying a plurality of sheets at a distance applied to the extremely thick paper. Then, as illustrated in FIGS. 11A and 14, the control unit 200 sets the sheet conveyance speeds of the conveyance roller pairs 33a, 33b, 33c, and 33d at the conveyance speed Vf=1000 mm/s. Further, the control unit 200 sets the sheet conveyance speeds of the obliquely conveying roller pairs 32a, 32b, and 32c at the conveyance speed Vd=1000 mm/s. Then, the control unit 200 sets the sheet conveyance speed of the shift roller pair 31 at the conveyance speed Vs=1000 mm/s. To be noted, the conveyance speed of the secondary transfer roller pair 500 is being set at the conveyance speed Vt=500 mm/s that is the image forming speed.

In a state in which the conveyance speed of each roller pair has been set as described above, the sheet S is conveyed to the shift roller pair 31 (refer to FIGS. 6A to 8B) with the skew corrected as described above. Hereinafter, a processing in which, as described above, in the first mode, the obliquely conveying roller drive motor 32M and the shift roller drive motor 31M are controlled such that the conveyance speeds (rotational speeds) of the obliquely conveying roller pairs 32a, 32b, and 32c and the shift roller pair 31 become 1000 mm/s (first rotational speed), and in which the sheet is conveyed to the shift roller pair 31 by the obliquely conveying roller pairs 32a, 32b, and 32c, which are in the nipping conveying state, is referred to as fourth processing. Then, as with the second mode described above, when the first leading edge detection sensor 311 has detected the leading edge of the sheet S, the control unit 200 starts the time measurement of the timer t (STEP S4). At this time, upon receiving this detection of the leading edge of the sheet S, as described above, the control unit 200 calculates the timing for decelerating the shift roller pair 31 in accordance with a timing in which timings of the sheet S and the toner image are aligned with each other at the secondary transfer roller pair 500 (STEP S5). Further, at this time, upon receiving this detection of the leading edge of the sheet S, the control unit 200 disengages the driven and drive rollers of the obliquely conveying roller pairs 32a, 32b, and 32c, and switches the obliquely conveying roller pairs 32 to the non-nipping state. Hereinafter, a processing in which, as described above, in the first mode, the obliquely conveying roller pairs 32a, 32b, and 32c transit from the nipping conveying state to the non-nipping state, is referred to as fifth processing.

As illustrated in FIGS. 13 and 14, in a calculated timing for decelerating the shift roller pair 31, the control unit 200 decelerates the conveyance speed of the shift roller pair 31 from the conveyance speed Vs=1000 mm/s to the conveyance speed Vs=500 mm/s that is the image forming speed. Further, at the same time (in synchronization with the deceleration of the shift roller pair 31), the control unit 200 decelerates the conveyance speeds of the obliquely conveying roller pairs 32a, 32b, and 32c from the conveyance speed Vd=1000 mm/s to the conveyance speed Vd=500 mm/s that is the image forming speed (STEP S7).

Thereby, when the sheet S has been conveyed to the secondary transfer roller pair 500 with the timing for conveying the sheet S to the secondary transfer roller pair 500 adjusted by the shift roller pair 31, the toner image (image)

is accurately transferred onto a printing position of the sheet S (STEP S8). That is, in STEPS S7 and S8, serving as sixth processing, along with controlling the shift roller drive motor 31M such that the conveyance speed (rotational speed) of the shift roller pair 31 is decelerated from 1000 mm/s (first rotational speed) to 500 mm/s (second rotational speed), the control unit 200 decelerates the conveyance speeds (rotational speeds) of the obliquely conveying roller pairs 32a, 32b, and 32c from 1000 mm/s to 500 mm/s. 500 mm/s (second rotational speed) is a process speed that is the conveyance speed of the sheet at a time when the image forming unit 40 forms the image on the sheet S. During STEPS S7 and S8 described above, based on the detection result of the first leading edge detection sensor 311 and a timing in which the image forming unit 40 forms the image on the sheet, the control unit 200 adjusts the timing for decelerating the conveyance speeds of the obliquely conveying roller pairs 32a, 32b, and 32c from 1000 mm/s to 500 mm/s.

Further, in the sheet conveyance control by the first mode, at a time when the sheet S is conveyed at the conveyance speed (image forming speed) Vt=500 mm/s by the secondary transfer roller pair 500, also the conveyance speeds of the obliquely conveying roller pairs 32a, 32b, and 32c are decelerated to the conveyance speed Vd=500 mm/s. Thereby, at a time when the trailing edge of the sheet S passes through each of the obliquely conveying roller pairs 32a, 32b, and 32c, large relative speed differences between the conveyance speed of the sheet S and each of the conveyance speeds of the obliquely conveying roller pairs 32a, 32b, and 32c are not generated. Thereby, even if the obliquely conveying roller pairs 32a, 32b, and 32c come into contact with the surface of the sheet S, soiling and scratching of the trailing edge of the sheet S by the obliquely conveying roller pairs 32a, 32b, and 32c are suppressed.

When the timer t described above becomes a first predetermined time t1 after the trailing edge of the sheet S has passed through the obliquely conveying roller pair 32a (after a predetermined time since the first leading edge detection sensor 311 has detected the leading edge of the sheet), the control unit 200 restores the conveyance speeds of the obliquely conveying roller pairs 32a, 32b, and 32c (STEP S9). That is, in STEP S9, serving as seventh processing, the sheet conveyance speeds of the obliquely conveying roller pairs 32a, 32b, and 32c are accelerated from the conveyance speed Vd=500 mm/s to the conveyance speed Vd=1000 mm/s. Thereby, the obliquely conveying roller pairs 32a, 32b, and 32c return to a state in which it is possible to receive the succeeding sheet S' when the sheet S' reaches the obliquely conveying roller pairs 32a, 32b, and 32c. The first mode of the present embodiment at least includes the fourth, fifth, sixth, and seventh processing described above.

Further, thereafter, when the timer t becomes a second predetermined time t2 after the trailing edge of the sheet S has passed through the shift roller pair 31 and before the leading edge of the succeeding sheet S' reaches the shift roller pair 31, the control unit 200 restores the conveyance speed of the shift roller pair 31 (STEP S10). That is, the control unit 200 accelerates the sheet conveyance speed of the shift roller pair 31 from the conveyance speed Vs=500 mm/s to the conveyance speed Vs=1000 mm/s.

The sheet conveyance control for a single sheet of the sheet S by the first mode is completed with the steps described above, and the control unit judges whether or not there is the succeeding sheet (succeeding sheet S') (STEP S11). In a case where there is the succeeding sheet (STEP S11: Yes), the control unit 200 returns to STEP S2 described above, and, if the succeeding sheet is the same extremely thick paper, again, performs the sheet conveyance control by the first mode. Then, in a case where there is not the succeeding sheet (STEP S11: No), the control unit 200 ends the print job (STEP S19) with the steps described above, and ends this sheet conveyance control.

To be noted, in STEP S3 described above, at a time of setting the sheet gap applied to the extremely thick paper, so as to ensure a time for accelerating and decelerating the conveyance speed Vd of the obliquely conveying roller pairs 32, it is necessary to set a wider distance between the proceeding sheet S and the succeeding sheet S' than a case of a sheet other than the extremely thick paper. Thereby, as illustrated in FIGS. 13 and 14, after the proceeding sheet S has passed through the obliquely conveying roller pairs 32 (at a time when the first time t1 has passed), the obliquely conveying roller pairs 32a, 32b, and 32c can restore the conveyance speed and receive the succeeding sheet S'.

As described above, in the sheet conveyance control of the printer 1 of the present embodiment, in a case of conveying the extremely thick paper, by performing the first mode, the obliquely conveying roller pairs 32 are also decelerated in response to the deceleration of the shift roller pair 31. Thereby, it is possible to suppress soiling, caused by the obliquely conveying roller pairs, which have been switched to the non-nipping state, and scratching, caused by the generation of the edge curl, of the trailing edge of the sheet S, which has been decelerated to the image forming speed by the shift roller pair 31, and is possible to suppress the quality degradation of deliverables.

Further, in the sheet conveyance control of the printer 1 of the present embodiment, in a case of conveying a sheet (such as regular paper) other than the extremely thick paper, by performing the second mode, along with improving the productivity, highly precise image formation is enabled. Therefore, depending on the type of the sheet, along with suppressing the quality degradation of the deliverables, it is also possible to improve the productivity.

OTHER EMBODIMENTS

To be noted, in the present embodiment described above, the first roller pair capable of being switched between the nipping conveying state and the non-nipping state is one of the obliquely conveying roller pairs 32, and the second roller pair performing the deceleration of the sheet conveyance speed is the shift roller pair. However, it is not limited to this, and any configuration is acceptable as long as it includes a roller pair performing the deceleration of the sheet conveyance speed and the other roller pair capable of being switched to the non-nipping state by disengaging a roller pair in a position farther upstream than the roller pair performing the deceleration of the sheet conveyance speed.

Further, while, in the present embodiment, in a case where the type of the sheet is the extremely thick paper, the first mode is performed and, in a case of a sheet other than the extremely thick paper, the second mode is performed, it is not limited to this, and it is acceptable that the first mode is performed for all types of the sheet. In this case, while the productivity is decreased to less than the second mode, it is possible to suppress soiling and scratching of the sheet for any type of the sheet.

Further, while, in the present embodiment, the first mode and the second mode are selected depending on the type of the sheet, it is not limited to this, and it is acceptable that, for example, the user selects the mode by using the operation unit and the computer 300. In this case, it is conceivable to make the modes selectable, such as to make the first mode a quality-oriented mode and the second mode a productivity-oriented mode.

Further, in the first mode of the present embodiment, the obliquely conveying roller pairs 32 (first roller pair) is decelerated to the same conveyance speed in synchronization with the deceleration of the rotational speed of the shift roller pair 31 (second roller pair). However, it is not limited to this, and, if the rotational speed of the first roller pair is decelerated to equal to or less than the rotational speed of the second roller pair, it is possible to suppress the edge curl as illustrated in FIG. 15B. That is, in the first mode, in a case where the rotational speed of the second roller pair is decelerated to the second rotational speed, by decelerating the rotational speed of the first roller pair to equal to or less than the second rotational speed, it is possible to obtain an effect of suppressing the quality degradation of the deliverables. For example, in a case where, in the first mode, in STEP S7, the rotational speed of the shift roller pair 31 (second roller pair) is decelerated to the rotational speed of 500 mm/s, it is acceptable to decelerate the rotational speeds of the obliquely conveying roller pairs 32 (first roller pair) from 1000 mm/s to equal to or less than 500 mm/s. At this time, it is acceptable to decelerate the rotational speeds of the obliquely conveying roller pairs 32 (first roller pair) to, for example, equal to or more than 450 mm/s and less than 500 mm/s.

Further, in the second mode of the present embodiment, in a case where the rotational speed of the shift roller pair 31 (second roller pair) is decelerated, the rotational speeds of the obliquely conveying roller pairs 32 (first roller pair) are kept unchanged. However, if, in this case, the rotational speed of the first roller pair is faster than the rotational speed of the second roller pair, it is possible to prevent the sheet conveyance speed of the first roller pair from decreasing to less than the sheet conveyance speed of the second roller pair. That is, in the second mode, in a case where the rotational speed of the second roller pair is decelerated to the second rotational speed, by setting the rotational speed of the first roller pair faster than the rotational speed of the second roller pair, it is possible to obtain an effect of a productivity improvement.

Further, in the first mode of the present embodiment, the rotational speeds of the obliquely conveying roller pairs 32 are decelerated in synchronization with a timing in which the shift roller pair 31 is decelerated. However, it is not limited to this, and it is acceptable to decelerate the obliquely conveying roller pairs 32 in a predetermined timing by using the timer t. Since, as long as this timing is before the trailing edge of the sheet has passed through the conveyance roller pairs 33, it is possible to prevent such as the generation of the edge curl at the trailing edge of the sheet, it is acceptable to use the timer so as to measure a time during which this effect can be obtained.

Further, in the first mode of the present embodiment, the decelerated rotational speeds of the obliquely conveying roller pairs 32 are restored at a time when the first predetermined time t1 has passed after the first leading edge detection sensor 311 detected the leading edge of the sheet. However, it is not limited to this, and it is acceptable that the rotational speeds of the obliquely conveying roller pairs 32 are restored at a time when the leading edge of the succeeding sheet S' has been detected by, for example, the second leading edge detection sensor 312. Further, similarly, it is acceptable that the rotational speed of the shift roller pair 31 is restored at a time when the leading edge of the succeeding sheet S' has been detected by, for example, the second leading edge detection sensor 312.

Further, while, in the present embodiment, the printer 1 is the full color laser beam printer of the electrophotographic system, it is not limited to this. Any configuration or system, for example, such as an ink jet printer, is acceptable for the image forming unit which forms the image on the sheet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120556, filed Jul. 28, 2022, which is hereby incorporated by reference herein in its entirety.

What is claimed is:

1. An image forming apparatus comprising:
   a first roller pair including a first roller and a second roller, the first roller pair being configured to transit between a contact state in which the first roller and the second roller are configured to convey a sheet by coming into contact with each other, and a separated state in which the first roller and the second roller are separated from each other;
   a first driving unit configured to drive the first roller pair;
   a second roller pair disposed downstream of the first roller pair in a conveyance direction of the sheet;
   a second driving unit configured to drive the second roller pair;
   an image forming unit disposed downstream of the second roller pair in the conveyance direction and configured to form an image on the sheet; and
   a control unit configured to execute a first mode in a case where a thickness of the sheet is a first thickness, and configured to execute a second mode in a case where the thickness of the sheet is a second thickness thinner than the first thickness, wherein the second mode includes (1) a first processing of controlling the first driving unit and the second driving unit such that rotational speeds of the first roller pair and the second roller pair become a first rotational speed, and of conveying the sheet to the second roller pair by the first roller pair which is in the contact state, (2) a second processing of transiting the first roller pair from the contact state to the separated state, and (3) a third processing of controlling the second driving unit such that the rotational speed of the second roller pair is decelerated from the first rotational speed to a second rotational speed less than the first rotational speed, and of controlling the first driving unit such that the rotational speed of the first roller pair becomes faster than the second rotational speed, wherein the first mode includes (1) a fourth processing of controlling the first driving unit and the second driving unit such that the rotational speeds of the first roller pair and the second roller pair become the first rotational speed, and of conveying the sheet to the second roller pair by the first roller pair which is in the contact state, (2) a fifth processing of transiting the first roller pair from the contact state to the separated state, and (3) a sixth processing of controlling the second driving unit such that the rotational speed of the second roller pair is decelerated from the first rotational speed to the second rotational speed, and of controlling the first driving unit such that the rotational speed of the first roller pair is decelerated from the first rotational speed to equal to or less than the second rotational speed.

2. The image forming apparatus according to claim 1, wherein in the sixth processing, the control unit decelerates the rotational speed of the first roller pair from the first rotational speed to the second rotational speed which is a same as the rotational speed of the second roller pair.

3. The image forming apparatus according to claim 1, wherein, in the sixth processing, the control unit decelerates the rotational speed of the first roller pair in synchronization with a deceleration of the rotational speed of the second roller pair.

4. The image forming apparatus according to claim 1, wherein, in the sixth processing, the second roller pair conveys the sheet to the image forming unit.

5. The image forming apparatus according to claim 4, wherein the second rotational speed is a process speed that is a conveyance speed of the sheet at a time when the image forming unit forms the image on the sheet.

6. The image forming apparatus according to claim 1, further comprising a sheet detection sensor disposed downstream of the second roller pair in the conveyance direction and configured to detect a leading edge of the sheet, wherein, in the sixth processing, the control unit adjusts a timing for decelerating the rotational speed of the second roller pair from the first rotational speed to equal to or less than the second rotational speed based on a detection result of the sheet detection sensor and a timing in which the image forming unit forms the image on the sheet.

7. The image forming apparatus according to claim 6, wherein, after the sixth processing, the control unit performs a seventh processing of accelerating the rotational speed of the first roller pair from equal to or less than the second rotational speed to the first rotational speed, the seventh processing being performed after a trailing edge of a first sheet has passed through the first roller pair and before a second sheet succeeding the first sheet reaches the first roller.

8. The image forming apparatus according to claim 7, wherein, in the first mode, the control unit performs the seventh processing after a predetermined time has passed since the sheet detection sensor detected a leading edge of the first sheet.

9. The image forming apparatus according to claim 1, wherein, in the third processing, the control unit maintains the rotational speed of the first roller pair at the first rotational speed.

10. The image forming apparatus according to claim 1, further comprising an abutment portion configured to abut against a first end portion, in a width direction orthogonal to the conveyance direction, of the sheet, wherein the first roller pair is configured to obliquely convey the sheet toward the abutment portion in the separated state while nipping the sheet, and wherein the second roller pair is configured to move in the width direction while nipping the sheet which has been abutted against the abutment portion.

11. The image forming apparatus according to claim 10, further comprising a third roller pair disposed upstream of the first roller pair in the conveyance direction, and configured to obliquely convey the sheet toward the abutment portion, wherein the contact state and the separated state are respectively a first contact state and a first separated state, wherein the third roller pair includes a third roller and a fourth roller, the third roller pair being configured to transit between a second contact state in which the third roller and the fourth roller are configured to convey the sheet by coming into contact with each other, and a second separated state in which the third roller and the fourth roller are separated from each other, and wherein, in the fifth processing, the control unit transits the first roller pair from the first contact state to the first separated state and transits the third roller pair from the second contact state to the second separated state, and wherein, in the sixth processing, the control unit decelerates the rotational speed of the first roller pair from the first rotational speed to equal to or less than the second rotational speed, and decelerates the rotational speed of the third roller pair from the first rotational speed to equal to or less than the second rotational speed.

12. The image forming apparatus according to claim 1, wherein the image forming unit includes an image bearing member configured to bear a toner image, and a transfer roller configured to transfer the toner image borne on the image bearing member onto the sheet, and wherein, in the sixth processing, the control unit adjusts a transfer position of the toner image to be transferred onto the sheet by adjusting a timing for decelerating the rotational speed of the second roller pair from the first rotational speed to equal to or less than the second rotational speed.

* * * * *